United States Patent
Tajima et al.

(10) Patent No.: US 8,676,947 B2
(45) Date of Patent: Mar. 18, 2014

(54) RESOURCE RESERVATION APPARATUS AND METHOD

(75) Inventors: Kazuyuki Tajima, Kawasaki (JP); Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 766 days.

(21) Appl. No.: 12/474,411

(22) Filed: May 29, 2009

(65) Prior Publication Data
US 2009/0319664 A1 Dec. 24, 2009

(30) Foreign Application Priority Data
Jul. 24, 2008 (JP) .................................. 2008-191386

(51) Int. Cl.
*G06F 15/173* (2006.01)

(52) U.S. Cl.
USPC .......................................... 709/223; 709/229

(58) Field of Classification Search
USPC ......... 709/203, 223, 224, 225, 226, 229, 239, 709/242, 244, 217, 219
See application file for complete search history.

(56) References Cited

U.S. PATENT DOCUMENTS

| | | | | |
|---|---|---|---|---|
| 6,058,113 A * | 5/2000 | Chang | ............................ | 370/390 |
| 6,101,549 A * | 8/2000 | Baugher et al. | ............... | 709/238 |
| 6,453,349 B1 * | 9/2002 | Kano et al. | ..................... | 709/226 |
| 6,563,794 B1 * | 5/2003 | Takashima et al. | ........... | 370/236 |
| 6,628,649 B1 * | 9/2003 | Raj et al. | ....................... | 370/360 |
| 7,224,695 B2 * | 5/2007 | Ono et al. | ...................... | 370/401 |
| 7,499,436 B2 * | 3/2009 | Ikeda et al. | .................... | 370/338 |
| 7,826,476 B2 * | 11/2010 | Peyravian et al. | ............ | 370/458 |
| 2002/0163881 A1 * | 11/2002 | Dhong et al. | .................. | 370/225 |
| 2003/0090995 A1 * | 5/2003 | Illikkal et al. | ................. | 370/222 |
| 2004/0042402 A1 * | 3/2004 | Galand et al. | ................. | 370/237 |
| 2004/0073650 A1 * | 4/2004 | Nakamura | ..................... | 709/223 |
| 2004/0139199 A1 * | 7/2004 | Ando et al. | .................... | 709/227 |
| 2007/0014256 A1 * | 1/2007 | Le Faucheur et al. | ........ | 370/328 |
| 2007/0214280 A1 * | 9/2007 | Patel et al. | ..................... | 709/239 |
| 2008/0259954 A1 * | 10/2008 | Sahni et al. | .................... | 370/468 |
| 2009/0077238 A1 * | 3/2009 | Gao | .............................. | 709/226 |
| 2010/0208584 A1 * | 8/2010 | Sone et al. | ..................... | 370/228 |
| 2011/0292949 A1 * | 12/2011 | Hayashi et al. | ............... | 370/419 |

FOREIGN PATENT DOCUMENTS

JP 2002-141943 5/2002

OTHER PUBLICATIONS

R. Braden, et al., "RFC2205: Resource ReSerVation Protocol (RSVP)—Version 1 Functional Specification" (URL:http://www.rfc-editor.oro/rfc/rfc2205.txt) Sep. 1997.

* cited by examiner

*Primary Examiner* — Lashonda Jacobs
(74) *Attorney, Agent, or Firm* — Staas & Halsey LLP

(57) ABSTRACT

A resource reservation apparatus reserving a resource on a second and third route connecting a start with end node of the first route over a network having a resource on a first route, includes a resource controller for defining a fourth route including a link obtained by excluding a common link between the first and second route and between the first and third route from a link included in the first, second or third route, a message generator for generating a message used for reserving a resource of the link included in the fourth route and transmitting the message to a node on the fourth route, and a message processor for transmitting a message used for generating the second and third route from the resource on the first route and on the fourth route reserved by the message generator to a node included in the second or third route.

15 Claims, 42 Drawing Sheets

FIG. 3

| LINE CARD No. | PORT No. | DESTINATION NODE |
|---|---|---|
| 1 | 1 | C |
| 2 | 2 | G |
|  | 1 | A |
| ... |  |  |

FIG. 4

| LINE CARD No. | PORT No. | ACCOMMODATED ROUTE IDENTIFIER |
|---|---|---|
| 1 | 1 | 0010200301, 0020200304 |
|  | 2 | 0020030100, 0020200304 |
| 2 | 1 | 0020030100, 0010200301 |
| ... |  |  |

FIG. 5

| KEY (ROUTE ID) | DATA: BAND (LINE CARD No., PORT No.) |
|---|---|
| 0010200301 | 15M, (1, 1) |
| 0010200301 | 15M, (2, 1) |
| 0020030100 | 33M, (1, 2) |
| 0020030100 | 33M, (2, 1) |
| 0020200304 | 125M, (1, 1) |
| 0020200304 | 125M, (1, 2) |

FIG. 6

| LINE CARD No. | PORT No. | SIGNAL | BAND | | |
|---|---|---|---|---|---|
| 1 | 1 | 1GE | 1G | | |
| | 2 | 2.4G-POS | 2.4G | | |
| 2 | 1 | 1GE | 1G | | |
| ... | | | | | |

FIG. 10

| LINE CARD No. | PORT No. | ACCOMMODATED ROUTE IDENTIFIER |
|---|---|---|
| 1 | 1 | 0020200304 |
| | 2 | 0020030100, 0020200304, 0010200302 |
| 2 | 1 | 0020030100, 0010200301 |
| ... | | |

FIG. 11

| KEY (ROUTE ID) | DATA: BAND (LINE CARD No., PORT No.) |
|---|---|
| 0010200301 | 15M, (2, 1) |
| 0020030100 | 33M, (1, 2) |
| 0020030100 | 33M, (2, 1) |
| 0020200304 | 125M, (1, 1) |
| 0020200304 | 125M, (1, 2) |
| 0010200302 | 15M, (1, 2) |

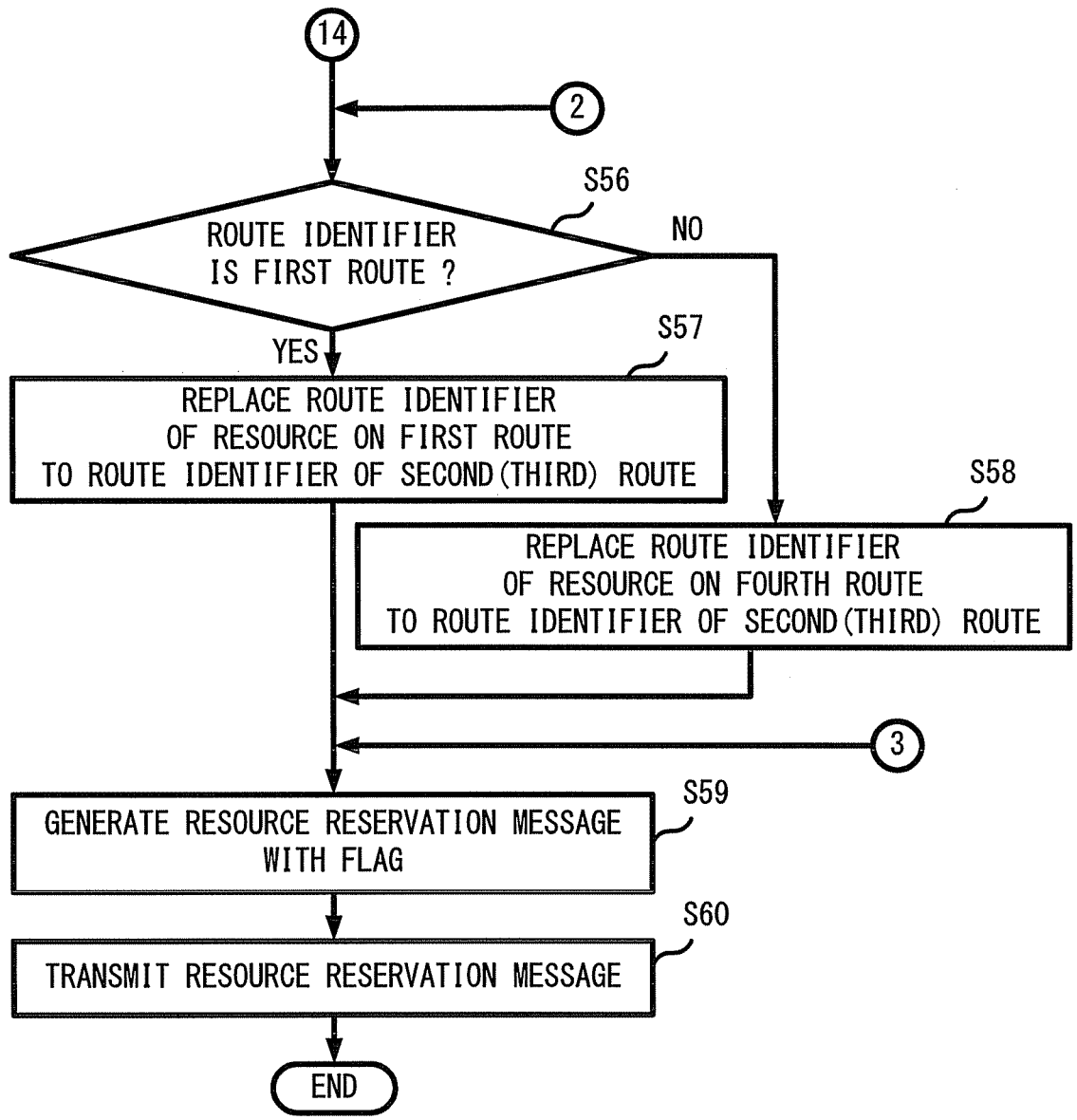

FIG. 15

| LINE CARD No. | PORT No. | ACCOMMODATED ROUTE IDENTIFIER |
|---|---|---|
| 1 | 1 | 0020200304 |
|   | 2 | 0020030100, 0020200304, 0010200311 |
| 2 | 1 | 0020030100, 0010200311 |
| ... |   |   |

FIG. 16

| KEY (ROUTE ID) | DATA: BAND (LINE CARD No., PORT No.) |
|---|---|
| 0010200311 | 15M, (2, 1) |
| 0020030100 | 33M, (1, 2) |
| 0020030100 | 33M, (2, 1) |
| 0020200304 | 125M, (1, 1) |
| 0020200304 | 125M, (1, 2) |
| 0010200311 | 15M, (1, 2) |

FIG. 18

| LINE CARD No. | PORT No. | P0_FLAG |
|---|---|---|
| 1 | 1 | 1 |
| 2 | 2 | 0 |
| | 1 | 1 |
| ... | | |

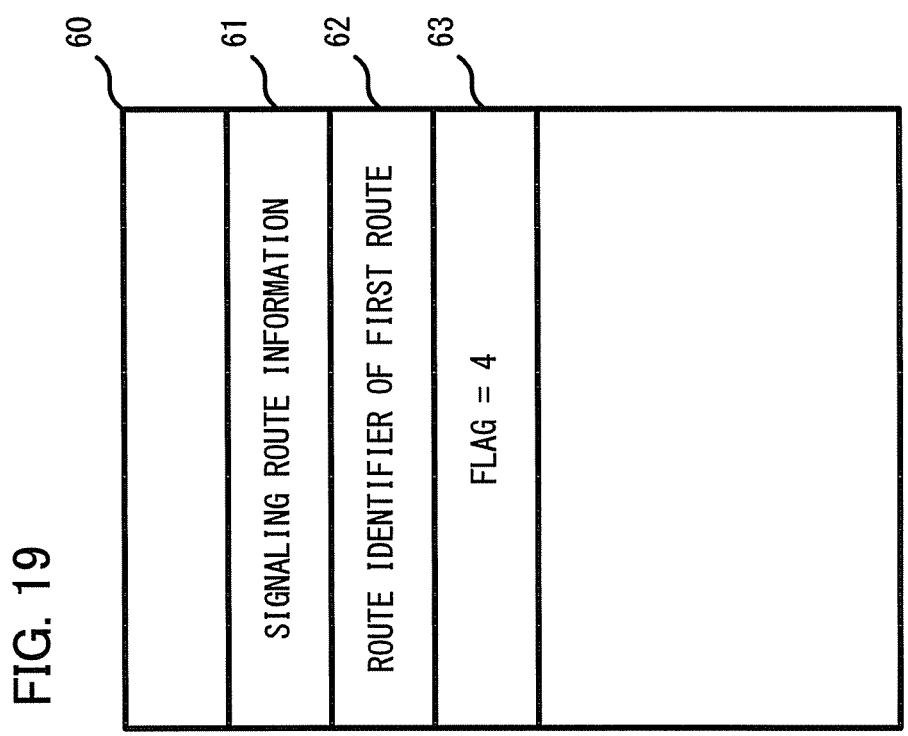

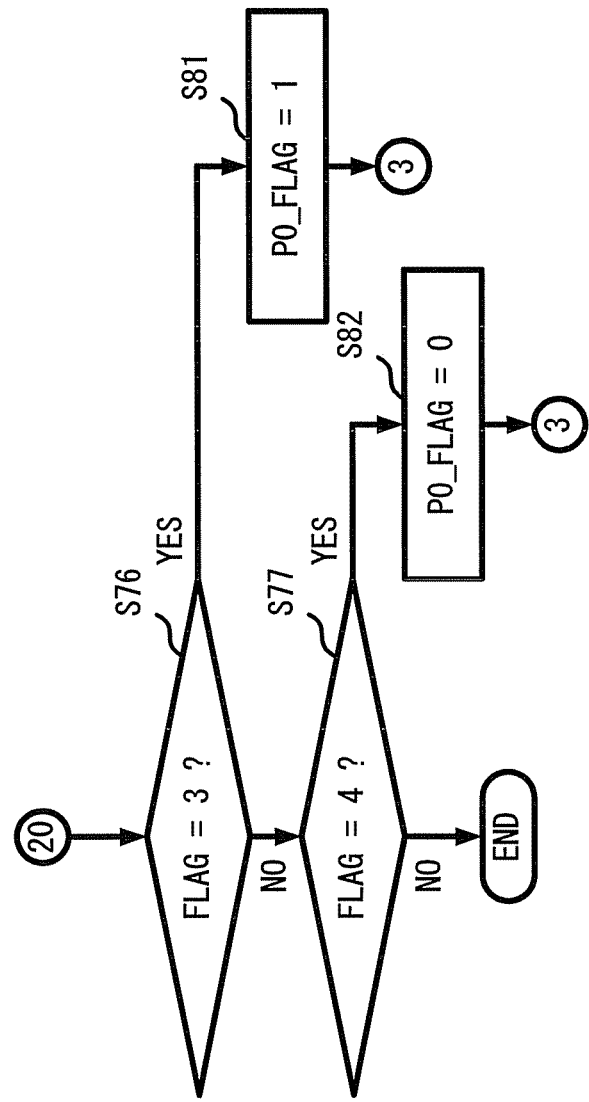

RESOURCE RESERVATION APPARATUS AND METHOD

CROSS-REFERENCE TO RELATED APPLICATIONS

This application is based upon and claims the benefit of priority of the prior Japanese Patent Application No. 2008-191386, filed on Jul. 24, 2008, the entire contents of which are incorporated herein by reference.

FIELD

The embodiments discussed herein are related to resource reservation apparatus and method.

BACKGROUND

When routes over a network are not configured redundantly, the buried fiber cut by a roadwork or the power failure in a main switching station due to a natural disaster may disconnect communication. Accordingly, in order to prevent the disconnection of communication, a circuit without a standby route (redundant route) may be added another route that is usable for the same communication for dual routes. In this case, the dual routes in a node-redundant relationship increase the possibility that the disconnection of communication can be prevented even in the event of failure. Here, the expression, "node-redundant relationship", refers to a relationship in which two routes do not pass through one same node. However, in order to implement the node-redundant routes, the deletion of the original route may sometimes be required.

FIGS. 31A-31E are diagrams illustrating the example in which the deletion of the original route is required when two node-redundant routes are set. It is assumed that, over a network with a network topology as shown in FIG. 31A, a first route having node A as the start node and node Z as the end node is set as shown in FIG. 31B. In this case, while keeping the first route, the redundant route connecting the node A and the node Z may not be set for the first route as the node-redundant route because the redundant route is not allowed passing through both of the node B and the node C. Therefore, in order to set two node-redundant routes, the first route, which is the original route, must be deleted, and the route (second route) indicated by the thick line in FIG. 31C and the route (third route) indicated by the broken line must be set. FIGS. 31D and 31E are diagrams showing the second route and the third route, respectively.

In this way, when the original route must be deleted to set a node-redundant route and when a resource reservation protocol like RSVP (Resource ReSerVation Protocol) is to be used to set a route, a PathTear message and a ResvTear message are used to delete the setting of the resource of the first route. After the deletion of the setting of the first route, the Path message and Resv message are used to secure the second route and third route.

Notably, as a related technology, for example, Japanese Laid-open Patent Publication No. 2002-141943 and R. Braden, Ed., L. Zhang, S. Berson, S. Herzog and S. Jamin, "RFC2205: Resource ReSerVation Protocol (RSVP)—Version 1 Functional Specification". (URL: http://www.rfc-editor.org/rfc/rfc2205.txt) disclose a method that searches optimal duplicated routes that connect two nodes. In this method, a loop is set over a communication network, and an optimum loop route that connects between transmitting/receiving loops including transmitting/receiving nodes is selected. The node route connecting the transmitting/receiving nodes along the perimeter of the optimum loop route is handled as the shortest duplicated routes.

The above-mentioned route setting method deletes the original route and then sets a redundant route. However, when the original route must be changed to set a redundant route, a part of the links included in the original route is included as a part of the redundant route. In the example shown in FIGS. 31A-31E, in the first route shown in FIG. 31B, the link between the node A and the node B is used by the second route, and the link between the node C and the node Z is used as the third route. Furthermore, because the second route and third route are routes that are used for the same communication as the communication used for the first route, the information to be set as a resource such as a band to be used is basically the same. Therefore, when the first route is deleted and the second route and the third route are then set, unnecessary processing occurs.

SUMMARY

According to an aspect of an embodiment, a resource reservation apparatus for controlling a resource allocation on a first route established by connecting a start node with an end node over a network, and for controlling a resource reservation on a second route and a third route respectively connecting the start node with the end node to establish dual routes, the resource reservation apparatus includes a resource controller for defining a fourth route including a link obtained by excluding a common link between the first route and the second route and a common link between the first route and the third route from a link included in any of the first route, the second route and the third route, a message generator for generating a message used for reserving a resource of a link included in the fourth route and transmitting the message to a node on the fourth route; and a message processor for transmitting a message used for generating the second route and the third route from the resource on the first route and the resource on the fourth route reserved by the message generator, to a node included in one of the second route and the third route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram showing an example of the destination table;

FIG. 4 is a diagram showing an example of a route list;

FIG. 5 is a diagram showing an example of a resource management table;

FIG. 6 shows an example of the table holding the types of signals and bands;

FIG. 10 is a diagram showing the routing list when the resource accommodated by the link BC is released and the resource accommodated by the link BG is reserved;

FIG. 11 is a diagram showing the resource management table when the resource accommodated by the link BC is released and the resource accommodated by the link BG is reserved;

FIGS. 14A-14B are flowcharts illustrating the operation by the node having received the resource reservation message to be used for the allocation of the reserved resource;

FIG. 15 is a diagram showing an example of the routing list changed by the allocation of a resource;

FIG. 16 is a diagram showing an example of the resource management table changed by the allocation of a resource;

FIG. 18 is a diagram showing an example of the table holding the states of flags after the resource reservation message is received;

FIG. 19 is a diagram showing an example of the message for resetting the flag indicating that the link is included in the first route;

FIGS. 20A-20B are flowcharts illustrating a resource reservation method using flag indicating that the link is included in the first route;

DESCRIPTION OF EMBODIMENTS

With reference to drawings, embodiments will be described in detail below.

First Embodiment

Figure 1A:
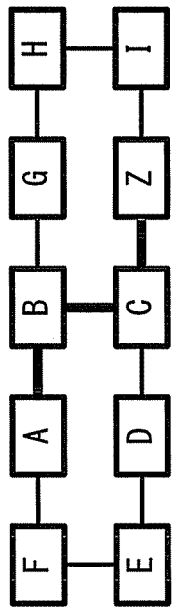
FIGS. 1A-1E are diagrams illustrating a method that sets a redundant route.
Figure 1B:
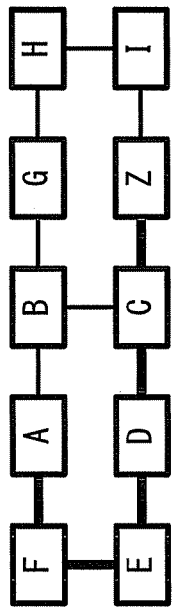
Figure 1C:
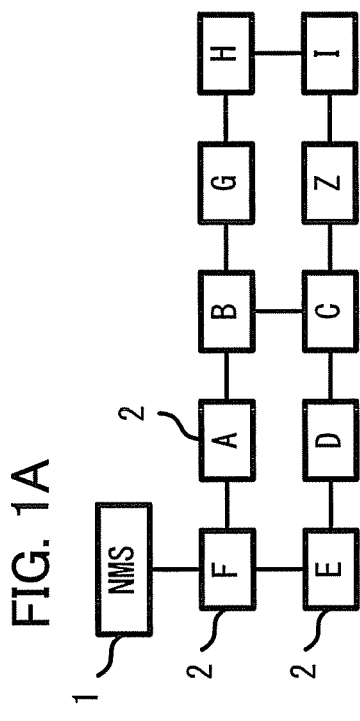
Figure 1D:
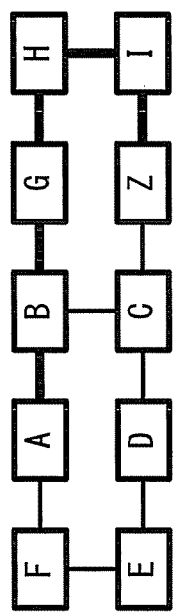

FIGS. 1A-1E are diagrams illustrating a method that sets a redundant route. The network shown in FIG. 1A includes a network management system (NMS) 1 and a plurality of nodes 2 which are circularly connected. It is assumed that a first route is set as where the node A is the start node and the node Z is the end node over the network shown in FIG. 1B. Here, if the second route and third route shown in FIGS. 1C and 1D are set as two redundant route, the link (link AB) between the node A and the node B is common to the first route and the second route. The link (link CZ) between the node C and the node Z is common to the first route and the third route. Therefore, before the second route or the third route is set, the information to be set for the link AB and link CZ is known. Therefore, the information having been used by the first route can be used to set the second route and third route.

Figure 1E:
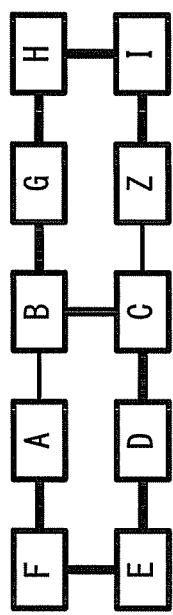

By adding the first route, second route and third route and subtracting the common link (link AB) between the first route and the second route and the common link (link CZ) between the first route and the third route from the result of the adding, the one route (fourth route) shown in FIG. 1E is obtained. The necessary link for the resource reservation for setting the redundant routes is included in the first route or fourth route. Then, along the fourth route, the resources for the links (B-G-H-I-Z) required for setting the second route and the links (A-F-E-D-C) required for setting the third route are reserved. Here, the resource of the fourth route for the link which is not included in the second route and the third route, (which is the link connecting the node B and the node C), is released. The resource reserved along the fourth route and the resource for the each common link between the first route and the second route and between the first route and the third route can be used for setting the second route and third route.

Notably, the term "link" refers to the connection between adjacent nodes over a network herein. The two alphabet letters after the term "link" as in the term "link AB" refer to two nodes connected by the link. For example, the term "link AB" refers to the link between the node A and the node B, and the term "link CZ" refers to the link connecting the node C and the node Z. The two hyphenated alphabet letters such as the "A-B" also refer to the link connecting the nodes specified by the alphabets.

In this way, a resource is reserved for only link excluding the link included in the original route to be changed between or among the redundant routes to be set. After that, by allocating the reserved resource and the resource, which is included in the original route, as the resource for the redundant route to be set, the redundant route is set. By the way, the first route in FIGS. 1A-1E corresponds to the original route.

It may be configured that the operation described above can be performed by the start node or by the NMS 1. The resource reservation and release are performed autonomously by the node 2 that holds the resource to be reserved, and it may be configured such that the message for instructing resource reservation, release and allocation can be transmitted by the start node or NMS 1 to a node over a network. Also in this case, because the start node or NMS 1 causes the node 2 to perform the resource reservation, the start node or NMS 1 substantially perform the resource reservation and so on.

Figure 2:
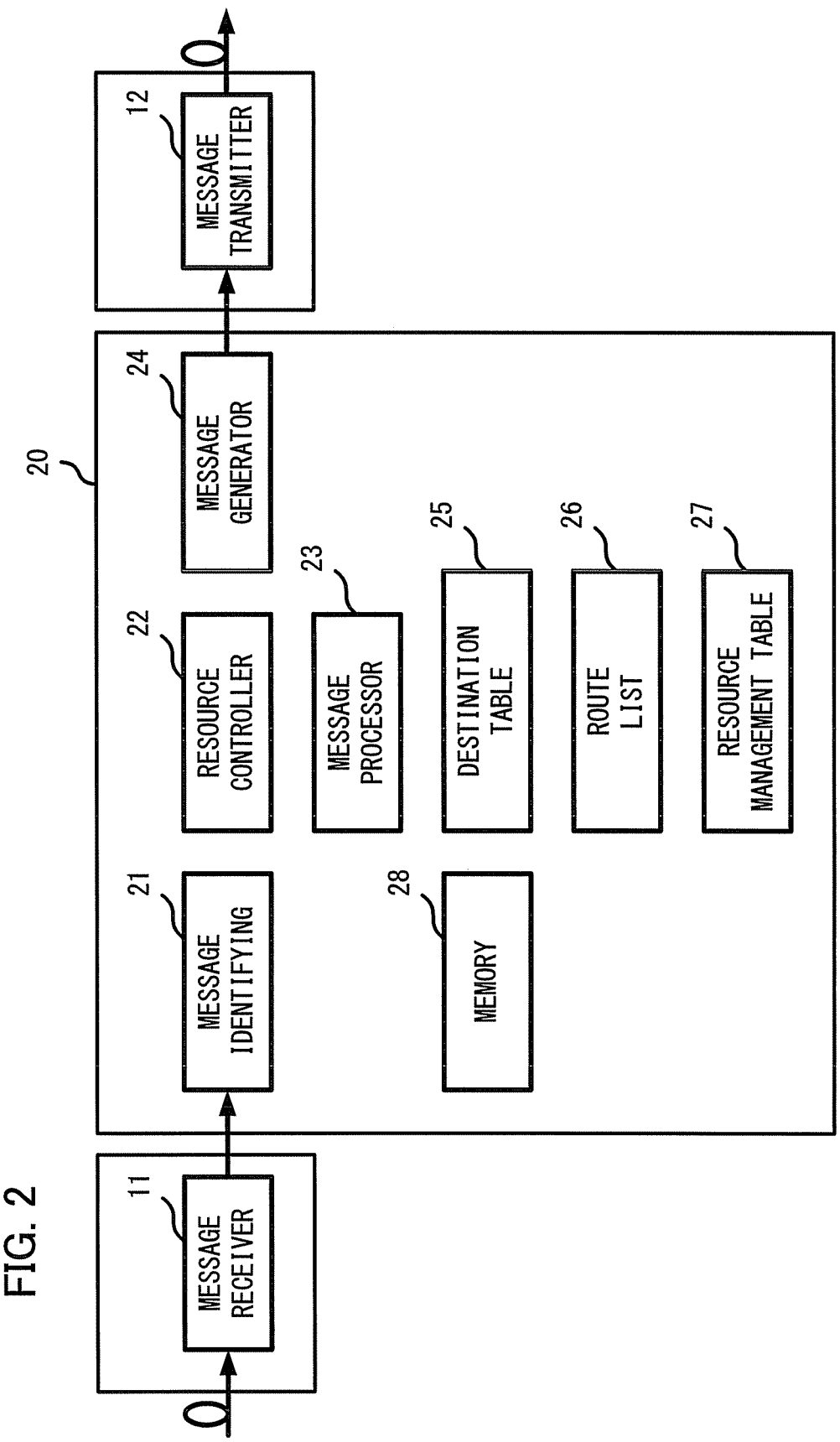
FIG. 2 is a diagram illustrating an example of the configuration of the part relating to the resource reservation of the resource reservation apparatus.

FIG. 2 is a diagram illustrating an example of the configuration of the part relating to the resource reservation of the resource reservation apparatus. In the resource reservation apparatus, the part that performs the resource reservation has a line card and an apparatus control unit 20. The line card includes a message receiver 11 and a message transmitter 12. The apparatus control unit 20 includes a message identifying part 21, a resource controller 22, a message processor 23, a message generator 24 and a memory 28. The apparatus control unit 20 further includes a destination table 25, route list 26 and a resource management table 27.

Notably, each of the resource controller 22, the message processor 23 and the message generator 24 may be implemented by an exclusive processor or firmware that a control program is stored in ROM, or may be implemented by a hardware circuit.

The line card transmits/receives a packet to/from other node and processes the packet transmitted from the apparatus control unit 20 or a packet to be received by the apparatus control unit 20. The message receiver 11 receives a signal from a transmission route and extracts a message therefrom. The message transmitter 12 transmits the generated message as a signal to the transmission route and may transmit a resource reservation message, for example. Notably, the arbitrary number of line cards can be connected to the apparatus control unit 20.

The message identifying part 21 checks the flag area contained in the received signaling message and identifies the presence and/or type of a flag to identify what kind of operation the received message requests. The resource controller 22 totally manages resources including changing the resource management table 27. The message processor 23 totally performs processing that uses the signaling message identified by the message identifying part 21. For example, in accordance with the received message, which route identifier of which link has the resource to be released is notified to the resource controller 22. The message generator 24 generates a resource reservation message.

The destination table 25 is a table describing to which node a line is connected and may store a line card number, a used port number and a connected node, for example. For example, the destination table 25 held by the node B over the network shown in FIG. 1 is shown in FIG. 3. In the example shown in FIG. 3, the port 1 of the line card 1 of the node B is connected to the node C. Similarly, the port 2 of the line card 1 of the node B is connected to the node G, and the port 1 of the line card 2 is connected to the node A. The destination table 25 may be used, for example, for that the message generator 24 searches which port is connected to the node that is the destination of the signaling message. Notably, the destination table 25 may vary in details among the implementations (for example, configuration of the line cards and lines). With IP (Internet Protocol), the destination table 25 can be used as the routing table.

The route list 26 includes a list of ports included by nodes and the routes accommodated by the ports. For example, the route list 26 held by the node B is shown in FIG. 4. For example, it shows that the port 1 of the line card 1 accommodates the route with the route identifier "0010200301" and the route with the identifier "0020200304". In combination with the destination table 25 shown in FIG. 3, it is found out that the port 1 of the line card 1 is connected to the node C, and it is found out that the route with the route identifier "0010200301" includes the link BC.

FIG. 5 is a diagram showing an example of the resource management table 27. The resource management table 27 records route identifiers (or route IDs) and data on the routes identifiable by the route IDs. In the example in FIG. 5, bands of the routes and the line card numbers and port numbers that accommodate the corresponding routes are held. The resource controller 22 determines whether the resource reservation to be performed is possible or not, as will be described later, by using the resource management table 27 to obtain the total number of bands used by a certain link. Furthermore, the apparatus control unit 20 may be configured to hold a table that stores the types of signals. FIG. 6 shows an example of the table holding the types of signals and the bands of links. It may be configured that the table holding the types of signals is included in the resource management table 27 and the resource management table 27 further holds the bands of the links.

Notably, the destination tables shown in FIGS. 3 to 6 are given for illustrated purpose only, and they may vary in configuration among the implementations such as the configuration that information excluding the shown information is stored in addition. A part or all of the part included in the line card and/or the apparatus control unit 20 may be implemented by software or may be implemented by a hardware circuit or hardware circuits. The memory 28 may include, for example, a ROM and/or a RAM and stores the program or programs and data to be used for processing. In order to implement the function of the apparatus control unit 20, for example, by software, the apparatus control unit 20 uses the memory 28 to execute the corresponding program so that the functions of the message identifying part 21 and the resource controller 22, for example, can be provided.

An embodiment in a case where the first route shown in FIG. 1B has been set and the second route and third route shown in FIGS. 1C and 1D are to be set will be described below. The expression "route is (or has been) set" herein refers to a state that the resource is (or has been) allocated to the route. It is assumed that the network in the following description includes the NMS 1 and the nodes 2 such as the node A, as shown in FIG. 1A. Here, the network includes the NMS 1 though the NMS 1 is not shown in the subsequent drawings.

It assumes that the first route is the route that has been already set and that the second route and third route have been calculated by the NMS 1, for example, in advance. Those routes are given from the NMS 1 to the device that performs the resource reservation. In the following description, a message for resource reservation is transmitted from the start node A to the end node Z, and the node having received the resource reservation message reserves a transmission resource and a reception resource.

[Creation of Routes for Resource Reservation Processing]

Figure 7:
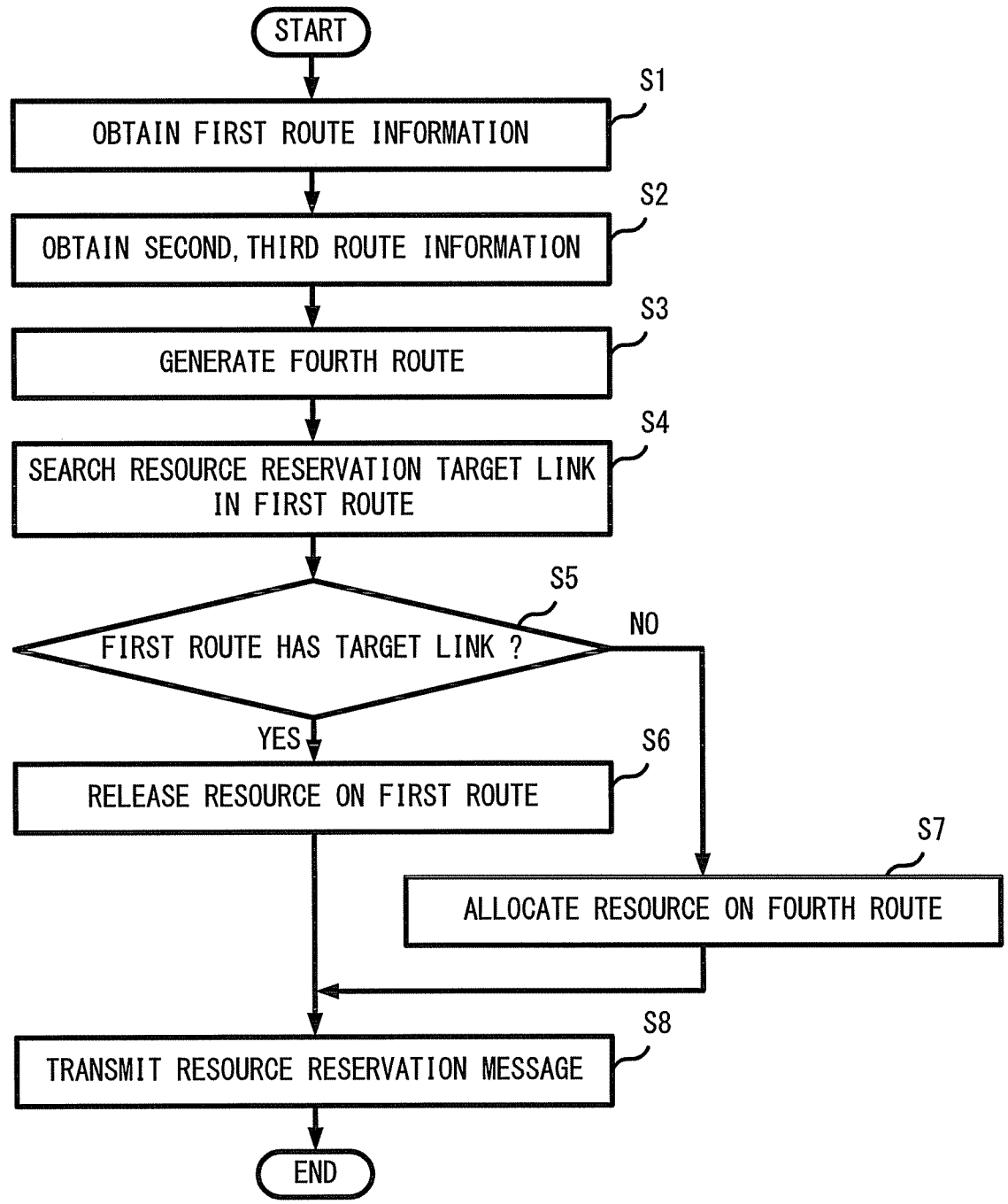
FIG. 7 is a flowchart illustrating an operation to be performed by a start node for making a resource reservation according to the first embodiment.

FIG. 7 is a flowchart illustrating an operation to be performed by a start node for making a resource reservation according to the first embodiment. The start node A obtains, from the NMS, first route information, which is currently set, and obtains information on the second route and third route to be set as redundant routes (steps S1 and S2). Here, the route information obtained by the start node A is generally a list of identifiers of nodes included in the routes in order from the starting point to the end point. The identifier of each of the nodes may be an arbitrary identifier by which the corresponding node is identifiable, such as the address of a node. Next, the obtained information on the first to third routes is used to generate the fourth route as shown in FIG. 1E (step S3). The method for generating the fourth route is as follows. First of all, it is assumed that the route information pieces to be obtained by the start node A for generating the fourth route include:

first route: A-B-C-Z;
second route: A-B-G-H-I-Z; and
third route: A-F-E-D-C-Z.

The resource controller 22 in the start node A compares the obtained first to third route information pieces and searches the link or links that is or are not common among plural routes. For example, the first route includes three links of A-B, B-C and C-Z, and the second route includes five links of A-B, B-G, G-H, H-I and I-Z. Therefore, between the first route and the second route, the link A-B is common. As the third route includes the links A-F, F-E, E-D, D-C and C-Z, the link C-Z is common between the first route and the third route. Therefore, the links that are not common to the plural routes are:

B-C included in the first route;
B-G, G-H, H-I and I-Z included in the second route; and
A-F, F-E, E-D and D-C included in the third route.

Here, inverting the direction of the link included in the first route, the link included in the first route, the links included in the second route and the links included in the third route may be connected to generate the fourth route:

A-F-E-D-C-B-G-H-I-Z as shown in FIG. 1E. In other words, the start node A adds the second route and third route to be set, subtracts the first route, which is the original route, from the sum, to calculate another route, which is the fourth route to be generated.

It may be configured that the calculation of the fourth route is also performed by the NMS 1 while the start node A obtains information of the first to fourth routes generated by the NMS 1 from the NMS 1. Notably, plural embodiments will be described herein, but, in any of the embodiments, the same method is applicable for creating the fourth route which is a route for resource reservation processing. Also in any of the embodiments, the start node operates substantially in the same manner.

In the description herein, the calculation of a route, which is performed by a node such as the start node, will sometimes be called "definition of a route". For example, the fourth route is a route to be calculated in the start node but is not a route that is actually set, unlike the second route. Therefore, the creation of the fourth route will sometimes be called definition of the fourth route.

[Resource Reservation and Release]

After the fourth route is obtained, the start node A makes a resource reservation for setting the second route and third route along the fourth route.

The resource controller 22 in the start node A determines whether the link AF is required to reserve or not because the fourth route includes the link AF (steps S4 to S7). The determination on the requirement of the reservation of the link will be described in detail later. Here, the operation to be performed by the resource controller 22 in a case where the reservation of the link AF is required and the start node A is going to make a resource reservation for the link AF. The link to be processed will sometimes be called "resource reservation target link" or "target link" in the following description.

If the target link to be reserved is recognized, the resource controller 22 determines whether the resource reservation is possible for the link or not. The determination is performed by using the resource management table 27 shown in FIGS. 5 and 6 and a table holding bands for links. From the information on the resource management table 27, the resource controller 22 calculates the total of bands to be used on the link AF and subtracts the result from a maximum band to obtain the band usable by the link AF that is the target link. If the usable band is larger than the band required for setting a redundant route, the resource of the link AF is reserved. For example, at the port 1 of the line card 1 shown in FIG. 6 may have a band of 1 Gbps. Referring to FIG. 5, for the port 1 of the line card 1, a route of 15 Mbps with the route ID 0010200301 and a route of 125 Mbps with the route ID 0020200304 are set. Therefore, subtracting the bands occupied by the routes that have been already set from the band for the link, a band of 860 Mbps is available. As a result, if the band required for the route to be set is smaller than 860 Mbps, the resource reservation is possible. The target link is reserved as the fourth route by adding the entry of the fourth route to the route list 26 and the resource management table 27.

Figure 8:
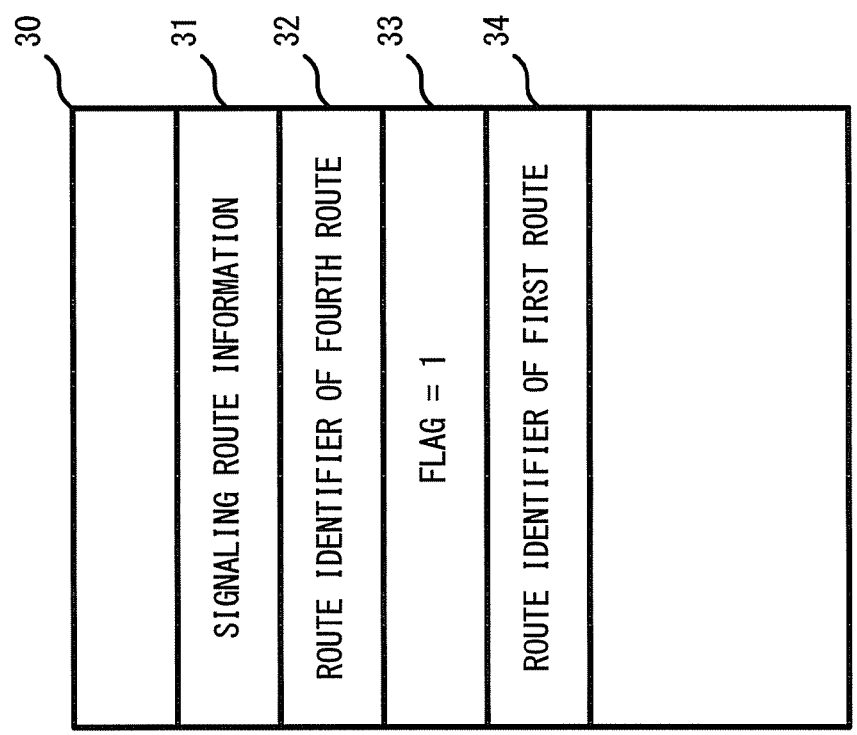
FIG. 8 is a diagram showing an example of the format of a resource reservation message.

If the reservation of the target link ends, the message generator 24 in the start node A generates a resource reservation message and transmits it to the node on the end node side of the fourth route (step S8). FIG. 8 is a diagram showing an example of the format of a resource reservation message 30. The resource reservation message 30 includes signaling route information 31, a route identifier 32 of the fourth route, a flag 33 and a route identifier 34 of the first route. If the flag 33 is set as "flag=1", the resource reservation and release are performed in the node having received the resource reservation message 30, as will be described later. Though the cancellation of the resource reservation is sometimes called "resource release" or "resource deletion" herein, both of them are synonymous.

The signaling route information 31 describes the information on the route for which the resource reservation message 30 is used and is equivalent to the route information on the fourth route. For example, it may hold the identifiers of the nodes on the fourth route in order from the starting point side. The route identifier 32 of the fourth route is an identifier by which the fourth route is identifiable and is the identifier that is used for adding the entry to the route list 26 and resource management table 27 by the start node. It is assumed in the following example that the route identifier "0010200302" of the fourth route is designated. The identifier may be used to change the resource management table 27, for example, in a node on the fourth route. The flag 33 is used for notifying the node having received the resource reservation message of the operation designated by the message. As shown in FIG. 8, the flag 33 having a value "1" indicates that it is a message that requests the resource reservation required for setting a redundant route. The route identifier 34 of the first route is the identifier indicating the first route, and is used for determining whether the reservation of a target link is required in the node having received the resource reservation message 30 or not. The determination on the requirement of the target link will be described later.

Figure 9A:
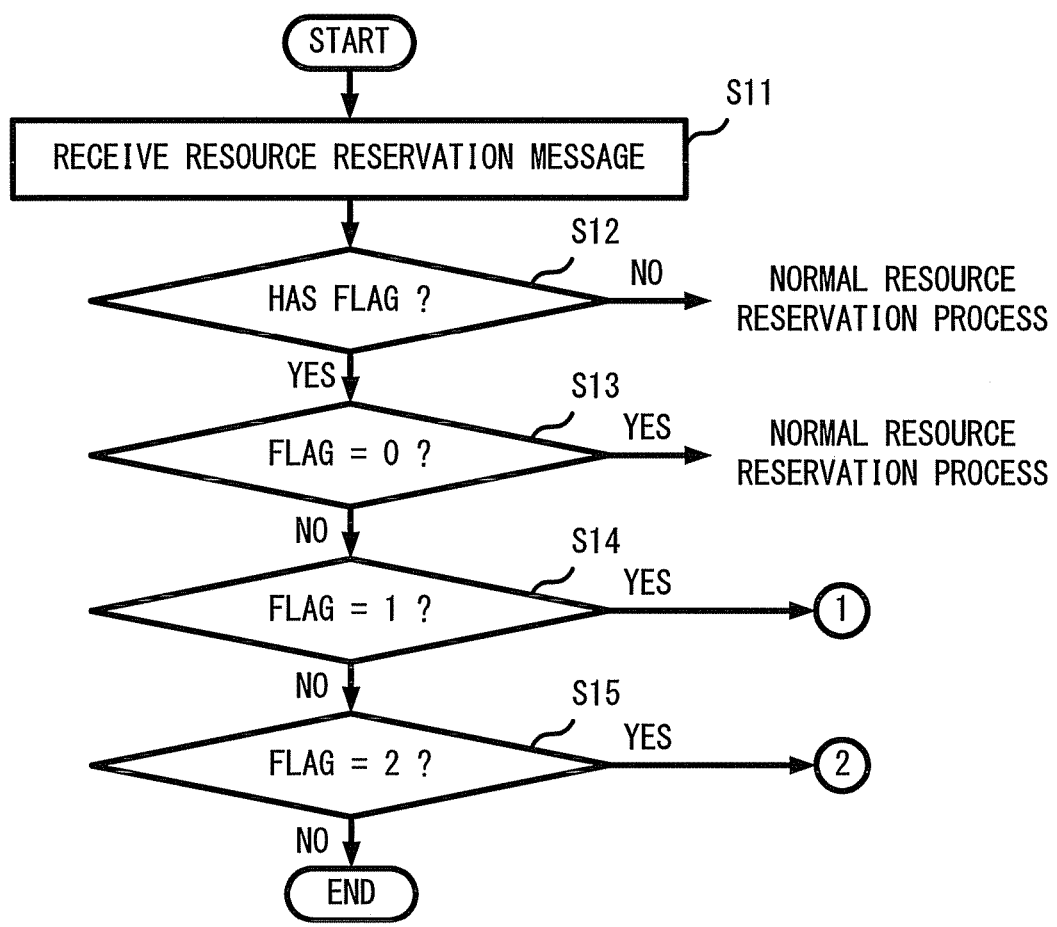
FIGS. 9A-9B are flowcharts illustrating an operation for making a resource reservation according to the first by the node having received the resource reservation message.
Figure 9B:
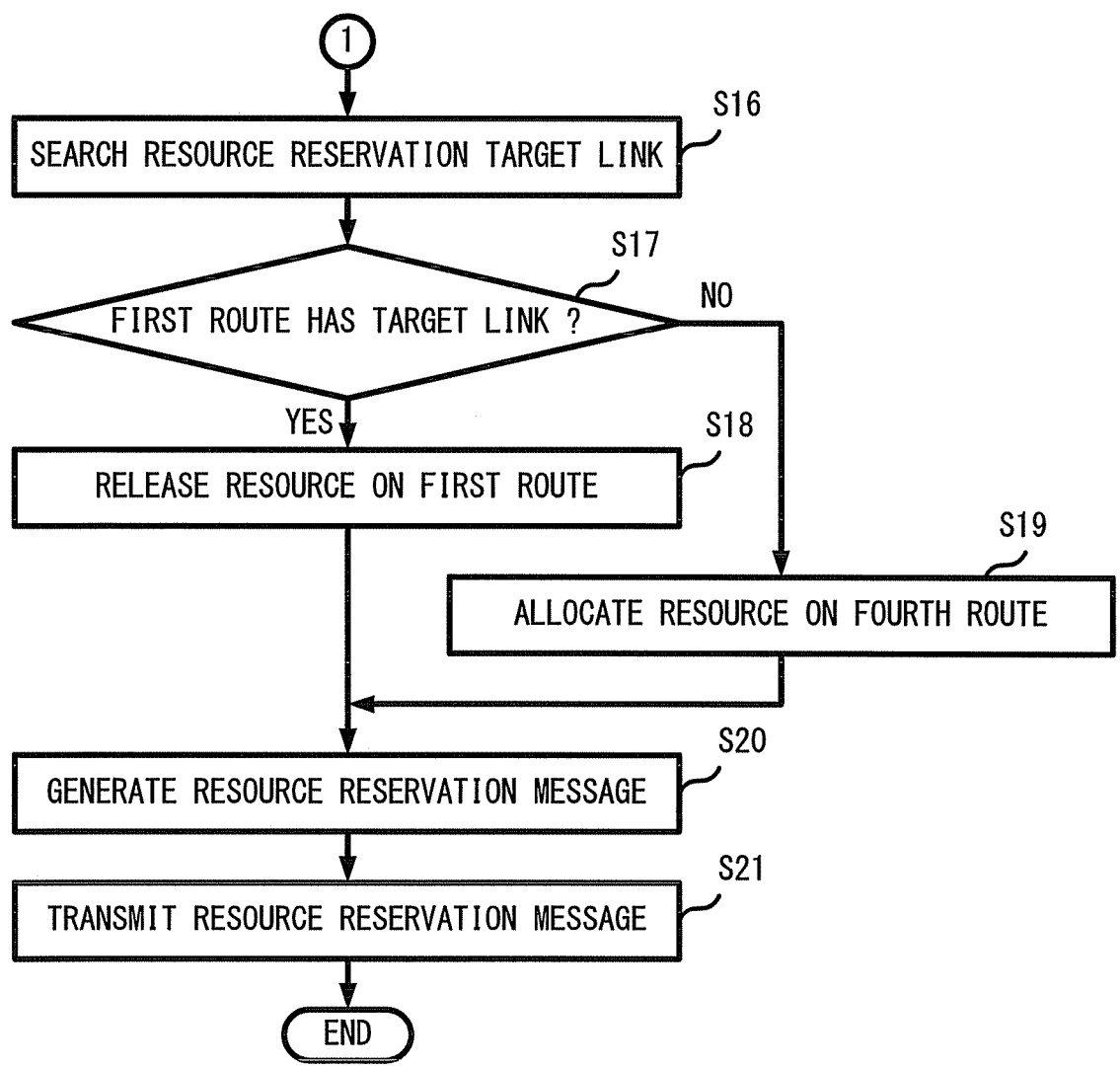

FIGS. 9A-9B are flowcharts illustrating an operation for making a resource reservation according to the first embodiment by the node having received the resource reservation message 30. Now, for example, the operation will be described which is to be performed by the node B if the node B receives the resource reservation message 30. It is assumed there that the node B holds the databases shown in FIGS. 3 to 6.

If the node B receives the resource reservation message 30, the message identifying part 21 identifies the flag 33 of the resource reservation message 30, as shown in FIG. 9A (steps S11 to S15). If the resource reservation message 30 does not contain the flag 33 or if the value of the flag 33 is "0", normal resource reservation processing is performed (steps S12 and S13).

If the value of the flag 33 is "1", the node B performs the processing shown in FIG. 9B. On the basis of result of the search for the target link included in the first route, whether the resource reservation for the target link is required or not is determined (steps S16 and S17). When the direction from the start node A to the end node Z is the direction of the transmission route, the target links of the node B include the link BG as the transmission route and the link BC as the reception route, which are included in the fourth route. Accordingly, the node B determines whether the resource reservation is required for the link BG and link BC or not.

Because, as described above, the fourth route is the result from the subtraction of the first route from the sum of the second route and third route to be set, the links included in the first route among the links included in the fourth route are not included in the redundant routes to be set, requiring no resources. In other words, the node B can check whether the target link is a link included in the first route or not to determine whether the reservation is required or not.

In order to check whether the target link is included in the first route or not, the resource controller 22 checks the route list 26 and the destination table 25. For example, when the route identifier of the first route is "0010200301", the link of the port 1 of the line card 1 and the link of the port 1 of the line card 2 are included in the first route among the links set in the node B, as shown in FIG. 4. The link of the port 1 of the line card 1 is the link BC, and the link of the port 1 of the line card 2 is the link BA. Then, the resource controller 22 determines that no reservation for the link BC is required. Then, the resource reservation used for using the first route is deleted and is released so as to be available for arbitrary communication (step S18).

On the other hand, the destination table 25 (in FIG. 3) describes that the link BG is connected to the port 2 of the line card 1. Referring to the route list 26 (in FIG. 4), the port 2 of the line card 1 does not include the first route with the route identifier "0010200301". Accordingly, the resource controller 22 in the node B determines that the resource of the link BG is required to reserve, and the resource reservation is performed by using the route identifier "0010200302" of the fourth route (step S19).

The route list 26 as a result of the release of the resource accommodated in the link BC and reservation of the resource to be accommodated in the link BG are performed in steps S18 and S19 is shown in FIG. 10. As shown in FIG. 10, on the route list 26, the resource, which is accommodated in the link used for the first route accommodated in the port 1 of the line card 1, is released, and the resource to be used in the fourth route is reserved for the link BG accommodated in the port 2 of the line card 1. In the same manner, as shown in FIG. 11, the resource management table 27 is updated in accordance with the release and reservation of the resource by the node B.

If the reservation of the target link ends, the message generator 24 in the start node B generates the resource reservation message and transmits it to the node G positioned on the end node side of the fourth route (steps S20 and S21). Also in nodes excluding the node B, the same operation is performed as described above if they receive the resource reservation message 30.

[Allocation of Resource]

Figure 12A:
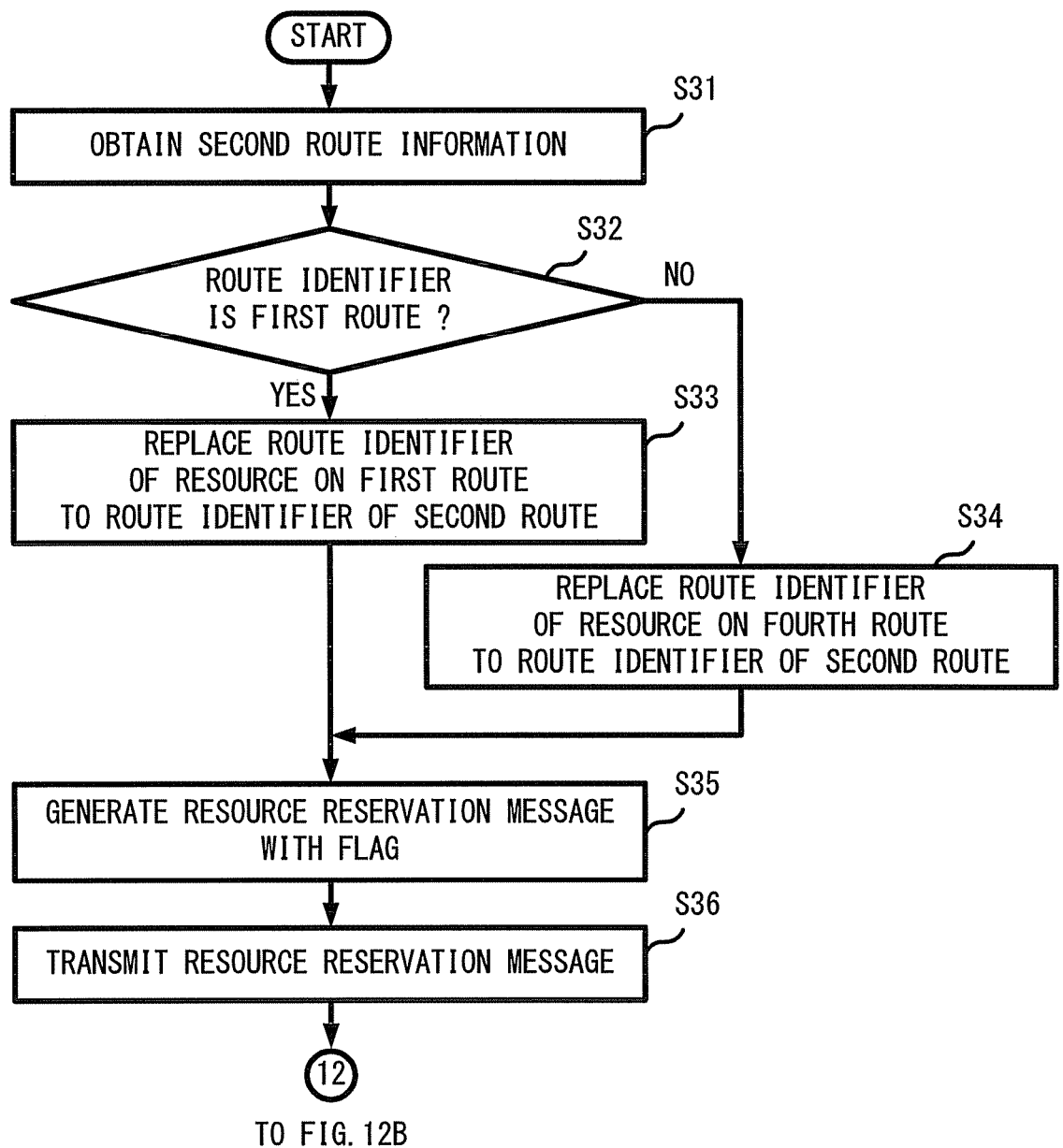
FIGS. 12A-12B are flowcharts illustrating the operation for allocating resources in a start node.
Figure 12B:
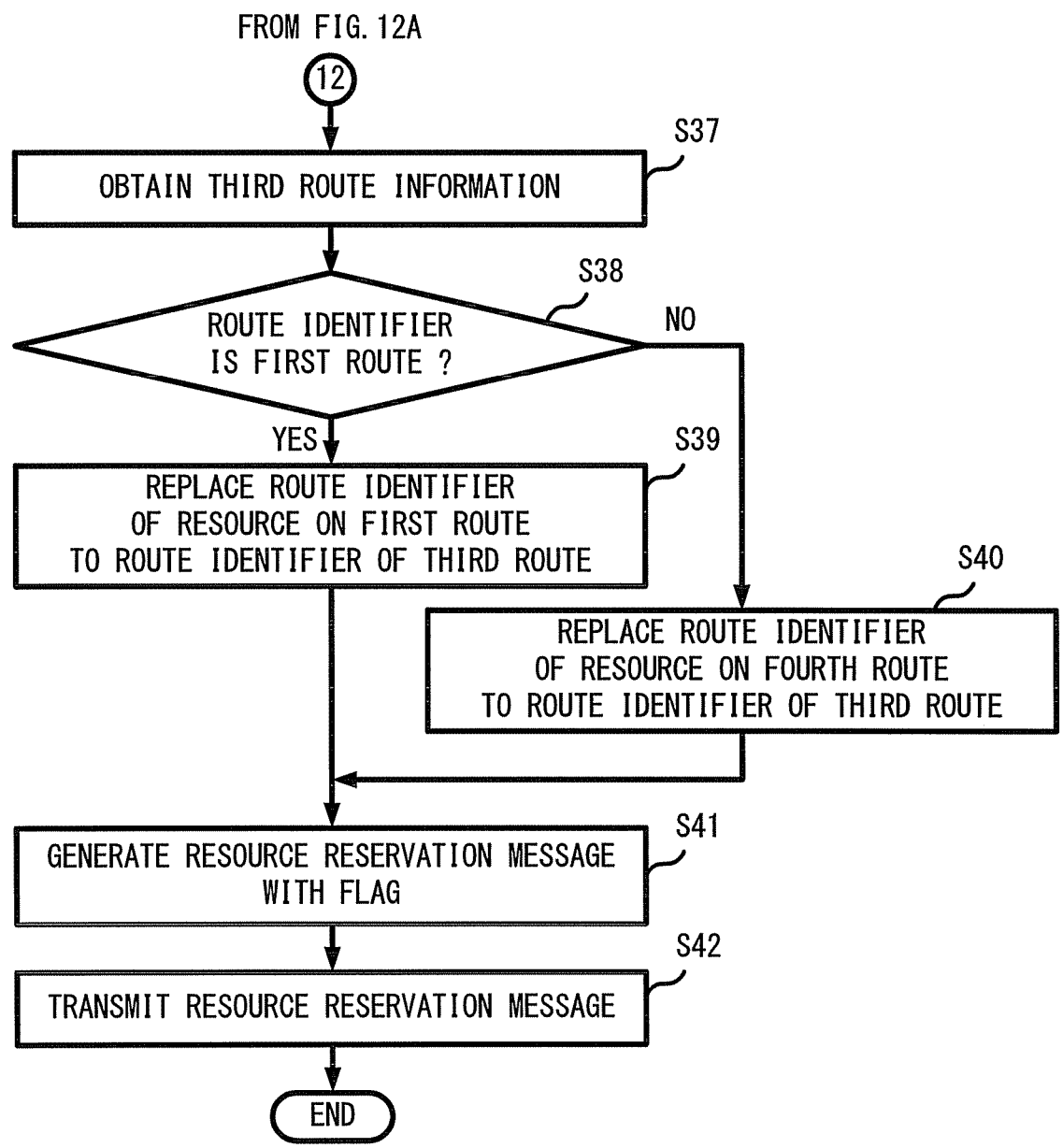

FIGS. 12A-12B are flowcharts illustrating the operation for allocating resources in a start node. The resource allocation is performed after the resource reservation along the fourth route ends. Here, it may be configured that the start node is notified of the end of the resource reservation by receiving a command from the NMS 1. It may be configured that the start node A performs signaling for checking whether the resource reservation has succeeded or not and, if it can determine that the resource reservation has ended, it may autonomously start resource reallocation processing.

If the resource reservation along the fourth route ends, the start node A obtains second route information (step S31). The target link is recognized on the basis of the obtained route information, and the destination table 25 and the route list 26 are used to identify the route identifier given to the target link. Here, the identifier given to the target link may be the route identifier for identifying the first route or may be the route identifier for identifying the fourth route. The identifier is replaced by the identifier for identifying the second route (steps S32 to S34). For example, if the second route is A-B-G-H-I-Z, the start node A recognizes the link AB as the target link included in the second route and checks the identifier. The route identifier given to the link AB is checked by using the destination table 25 and route list 26, as described above. Because the route identifier given to the link AB is the identifier of the first route, the start node A replaces the route identifier with the route identifier for identifying the second route. After that, the start node A generates a resource reservation message 40 as shown in FIG. 13, which is used for allocation of the reserved resource and transmits it to the node B positioned on the end point side of the second route (steps S35 and S36).

If the operation in steps S31 to S36 is finished for the resources of the links included in the second route, the start node A then allocates the resources to the third route (in steps S37 to S42). The processing on the resource for the links included in the third route is the same as the processing in steps S31 to S36.

Instead of obtaining the route information by the start node A in steps S31 and step S37, it may be configured that the start node A uses the information on the route obtained (step S2 in FIG. 7) when the fourth route is created for the resource allocation.

Figure 13:
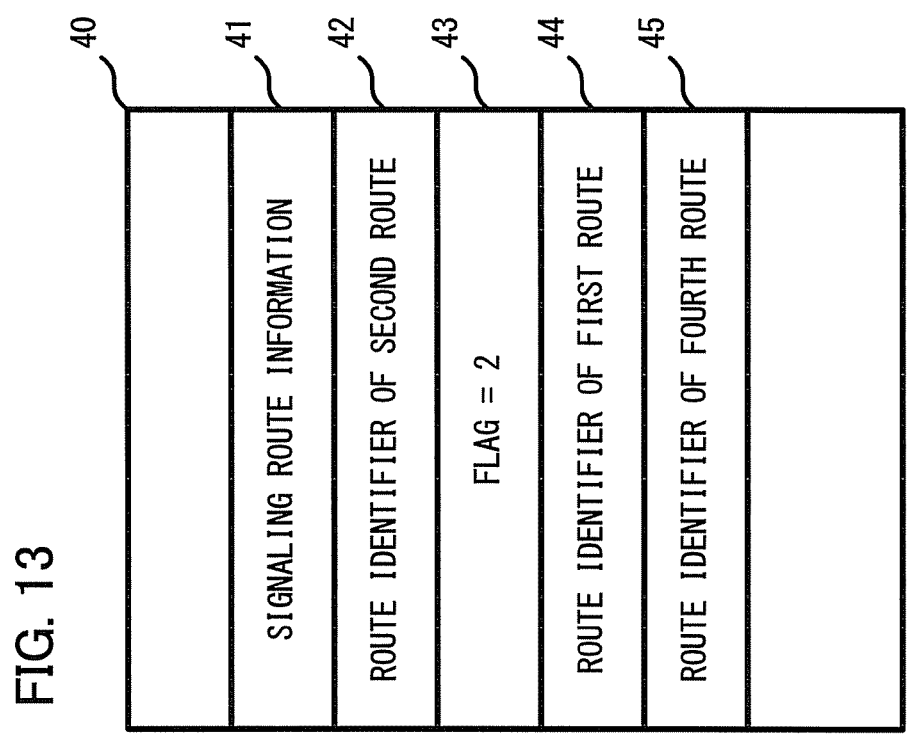
FIG. 13 is a diagram illustrating an example of the format of the resource reservation message to be used for the allocation of the reserved resource.

FIG. 13 is a diagram illustrating the format of the resource reservation message 40. The resource reservation message 40 includes signaling route information 41, a route identifier 42 of the second route, a flag 43, a route identifier 44 of the first route and a route identifier 45 of the fourth route. The signaling route information 41 may describe identifiers of the nodes included in the second route from the starting point side to the end point side, and the signaling for the resource allocation is performed along the second route. The node having received the resource reservation message 40 analyzes the signaling route information 41 and recognizes the destination node of the resource reservation message 40. By including the route identifier 42 of the second route in the resource reservation message 40, the route identifier to be designated by the replacement is notified to the other node. The route identifier to be replaced is recorded in the fields of the route identifier 44 of the first route and the route identifier 45 of the fourth route. The flag 43, as will be described later, is used for determining the operation to be performed by the node having received the resource reservation message 40. If "flag=2" is designated, it means the resource allocation.

Figure 14A:
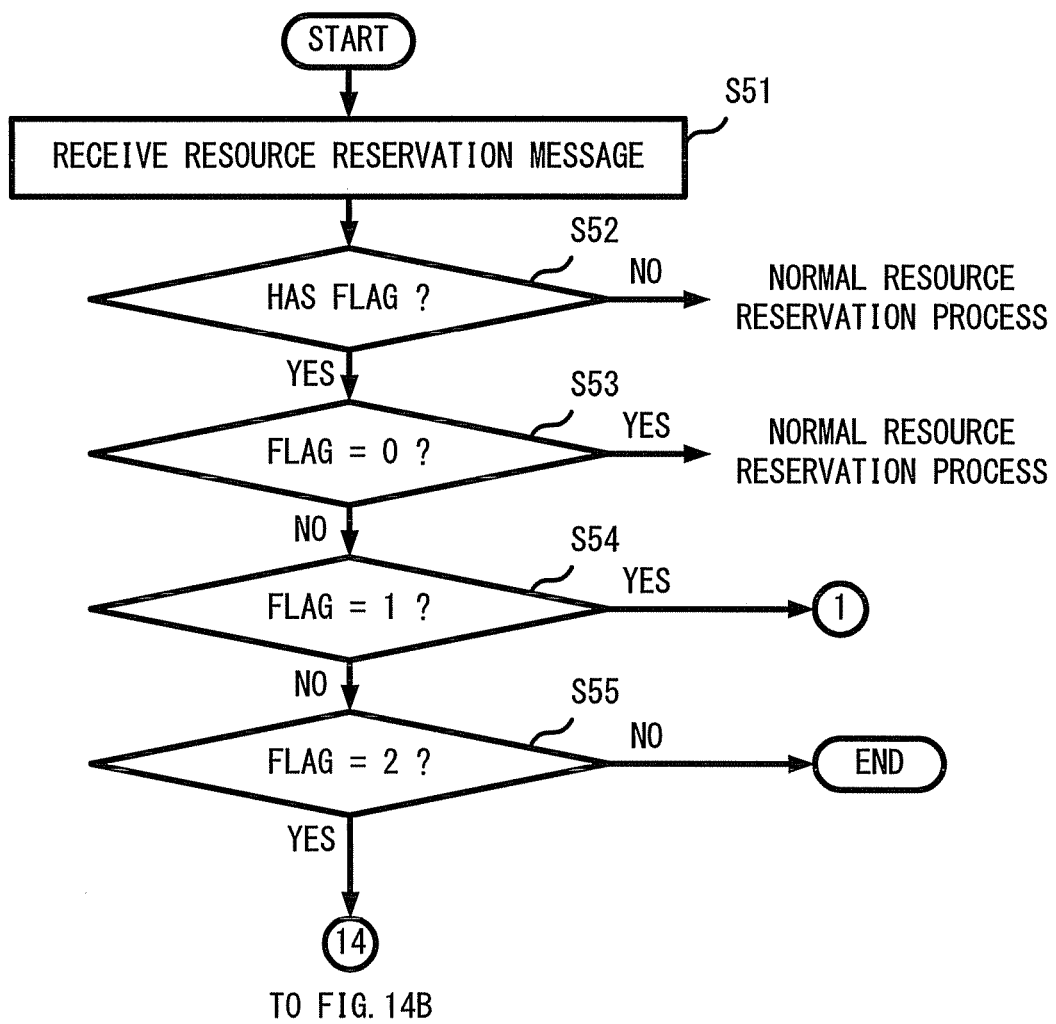

FIGS. 14A-14B are flowcharts illustrating the operation by the node having received the resource reservation message 40 to be used for the allocation of the reserved resource. If a node receives the resource reservation message 40, the node determines whether the flag 43 is included therein or not and determines the type of flag 43 (steps S51 to S55). The determination is performed by the message identifying part 21. In the node having received the resource reservation message 40 as shown in FIG. 13, if "flag=2" is determined in step S55, the processing moves to step S56. If the value of the flag is the number excluding 2, the processing is performed as described with reference to FIG. 9A.

The node having received the resource reservation message 40 recognizes the target link on the basis of the signaling route information 41 and uses the destination table 25 and route list 26 to identify the route identifier given to the target link. The identifier given to the target link may be the route identifier for identifying the first route or the route identifier for identifying the fourth route. The identifier is replaced by the identifier for identifying the second route (steps S56 to S58). After that, the node generates the resource reservation message 40 by changing the destination address and source address of the received message and transmits it to the node positioned on the end point side of the second route (steps S59 and S60).

For example, the operation to be performed when signaling is performed along the second route and the node B receives the resource reservation message 40 shown in FIG. 13 will be described in detail. If the node B receives the resource reservation message 40, the apparatus control unit 20 receives the resource reservation message 40 through the message receiver 11. Then, the message identifying part 21 checks the flag 43 and notifies that resource replacement is requested to the resource controller 22 and message processor 23 (steps S51 to S55).

On the basis of the signaling route information 41, the message processor 23 first recognizes that the resources of the link BG for transmission and the link AB for reception are reserved. Next, with reference to the destination table 25 shown in FIG. 3, it is recognized that the node is connected to the node G through the port 2 of the line card 1 and is connected to the node A through the port 1 of the line card 2. With reference to the route list 26 shown in FIG. 10, it is recognized that the route identifier "0010200302" is given to the resource of the link BG and "0010200301" to the resource of the link AB. The message processor 23 determines from the route identifiers of the reserved resources that the route identifier for identifying the fourth route is given to the resource of the link BG and the route identifier for identifying the first route to the resource of the link AB (step S56).

If the route including the resource of the target link is recognized, the message processor 23 requests the resource controller 22 to change the route list 26 and resource management table 27. For example, for the resource of the link AB, the route identifier for identifying the first route is requested to change to the route identifier "0010200311" for identifying the second route and the reserved resource is allocated to the second route. In the same manner, for the resource of the link BG, the route identifier for identifying the fourth route is requested to change to the route identifier for identifying the second route. The resource controller 22 changes the route list 26 in accordance with the instruction from the message processor 23 (steps S57 and 58). This operation changes the route list 26 from the one shown in FIG. 10 to the one shown in FIG. 15. In the same manner, the resource controller 22 changes the resource management table 27 shown in FIG. 11 to the one shown in FIG. 16.

For the link included in the third route, the route allocation is also performed in accordance with the resource reservation message 40 transmitted from the start node A to the node F. Notably, in the resource reservation message 40 used for the resource allocation, the route identifier of the third route is held in the field where the route identifier 42 of the second route has been held. The third route information also is held in the field holding the signaling route information 41. The resource reserved as the first route or fourth route is allocated to the third route.

The aforementioned resource reservation, release and allocation only set the database in the apparatus control unit 20 in a node, such as the resource management table 27. Therefore, on the basis of the table such as the resource management table 27, necessary setting must be performed on the apparatus connecting to the node as the occasion demands. Examples of the apparatus requiring the change in setting may include a packet switch, a priority buffer for packet multiplexing and a shaper for reducing the traffic congestion. In order to release a resource, the setting of the apparatus is changed, and the corresponding entry on the table is deleted.

In this way, if the resource reservation along the fourth route ends, the reserved resource on the fourth route and the resource on the first route are allocated to the second route and third route along the second route or third route, and the second route and third route are created. Therefore, the resource reservation or release is only performed on the link required to reserve, for example. For the links included in the first route for which the setting has been already done, the resource used in the first route is used. The resources of the links included in the first route can be used as the second route or third route by changing the settings of the route identifiers associating with the links used in the first route. Therefore, in setting a redundant route, the unnecessary setting work can be omitted, and the efficiency of the entire work can be increased.

One type of signaling message like the resource reservation message 30 can allow the resource reservation and release. Therefore, in performing resource reservation and release, the number of signaling outputs can be reduced, and the efficiency of the entire work can be increased.

Second Embodiment

According to the first embodiment, as in steps S18 and S19, the node having received the resource reservation message 30 determines whether the target link is the link that requires a resource reservation or the link that requires resource release. In this case, in order to increase the efficiency of the processing in the node having received the resource reservation message 30, each node is caused to recognize the links included in the first route before signaling for performing the resource reservation, for example, is performed. In this case, the start node of the first route performs signaling using a resource reservation message 50 along the first route, and the node having received the resource reservation message 50 is caused to record the fact that the link is included in the first route by using a special flag. The recording method will be described later in detail.

Figure 17:
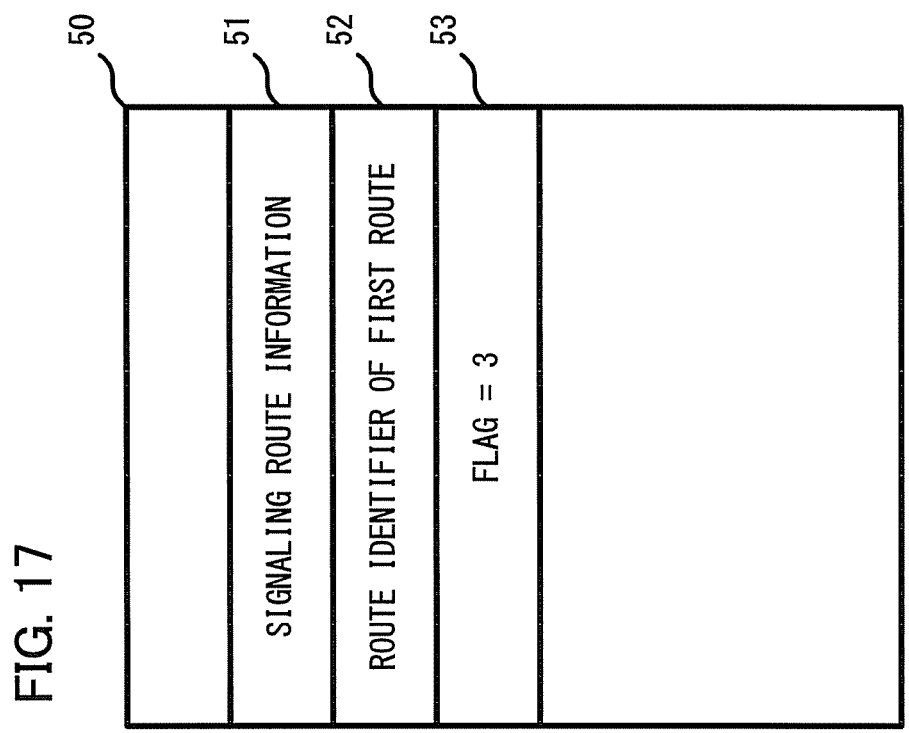
FIG. 17 is a diagram showing an example of the message for setting the flag indicating that the link is included in the first route.

FIG. 17 is a diagram showing an example of the message 50 for setting the flag indicating that the link is included in the first route. The resource reservation message 50 includes signaling route information 51, a route identifier 52 of the first route and a flag 53. The resource reservation message 50 having the flag 53 set as "flag=3" is a message for setting a flag for identifying links included in the first route.

Figure 18:
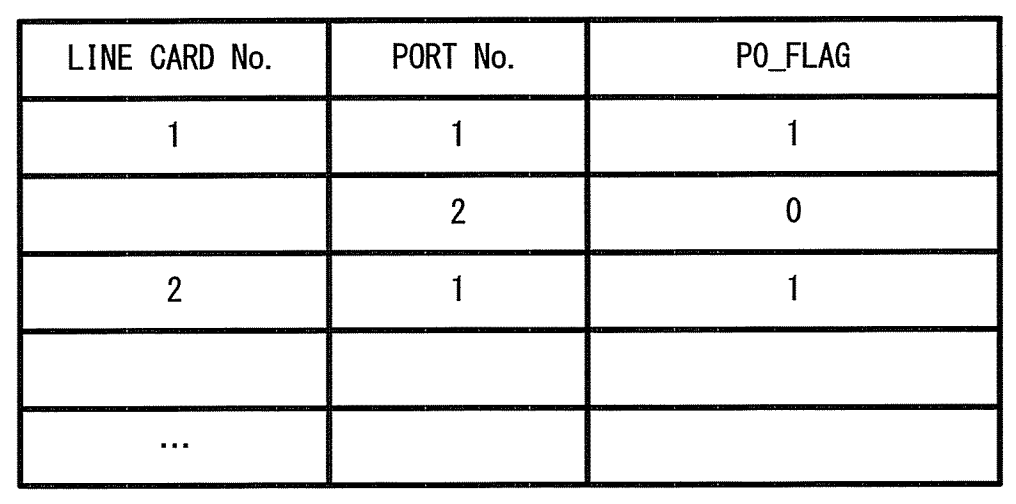

FIG. 18 is a diagram showing an example of the table (p0_flag table) holding the states of flags after the resource reservation message 50 is received. The p0_flag table in FIG. 18 is shown on the table held by the node B, for example. By recording on the p0_flag table the p0_flag for each port of a line card of the node B, the link connected to the node and the p0_flag are recorded in association. The method for recording the p0_flag table is as follows:

(1) Before the signaling message is received from the start node A, all links connecting to the node B are not set to include in the first route, and the p0_flags are set to "0".

(2) If the node B receives the resource reservation message 50 from the start node A, the message identifying part 21 in the node B uses the flag 53 to notify the message processor 23 of that the message that instructs the processing on the flag for identifying the first route has been received.

(3) The message processor 23 analyzes the signaling route information 51 and recognizes that the first route includes the link AB and the link BC.

(4) The message processor 23 requests the resource controller 22 to change the p0_flags of the link AB and link BC to "1". At that time, with reference to the destination table 25 (in FIG. 3), the message processor 23 notify the resource controller 22 of that the link BC is accommodated in the port 1 of the line card 1 and the link AB is accommodated in the port 1 of the line card 2.

(5) In accordance with the instruction from the message processor 23, the resource controller 22 changes the p0_flags of the link AB and link BC to "1". FIG. 18 shows the p0_flag table after the p0_flags are changed by the resource controller 22. The port 2 of the line card 1 is connected to node G but the link BG is not included in the first route. Therefore, the p0_flag is unchanged and keeps "0".

In this way, after the p0_flag table is recorded, the p0_flags on the p0_flag table may be checked to learn the target link is included in the first route. Therefore, when a node receives the resource reservation message 30 for performing resource reservation and release, the message processor 23 can request the resource controller 22 to perform resource reservation or release with reference to the p0_flag table. In other words, if the p0_flag is "1", the release of the resource of the link in the first route is requested. If the p0_flag is 0, the reservation of the resource of the link is requested.

Having described that the information of the signaling route information 51 is used for identifying the target link having the p0_flag to be changed, the route identifier 52 of the first route may be used to search through the route list 26 to identify the target having the p0_flag to be changed.

As described above, because the p0_flags are referred for resource reservation or release, the p0_flags may be necessary to reset after the second route and/or third route is/are set in order not to interfere with the settings of other routes.

FIG. 19 shows an example of a resource reservation message 60 for resetting a p0_flag. The resource reservation message 60 includes signaling route information 61, a route identifier 62 of the first route and a flag 63. In the resource reservation message 60, the flag 63 is set as "flag=4".

The signaling route information 61 holds the information on the first route, and the resource reservation message 60 is used for signaling along the first route. Because the links included in the first route have a p0_flag changed by the resource reservation message 50, the p0_flag is reset by using the signaling route information 61 in the nodes through which the resource reservation message 60 passes. The p0_flag reset is performed as in the p0_flag table recording method described with reference to FIG. 18 except that the p0_flag is set to "0".

Next, an operation to be performed in nodes when the resource reservation method using the p0_flag is applied will be described. In this method, the signaling outputs using four types of signaling messages including:

(a) the resource reservation message 50 to be used for setting the p0_flag;

(b) the resource reservation message 30 for the resource to be used for the resource reservation and release;

(c) the resource reservation message 40 used for the resource allocation; and (d) the resource reservation message 60 used for the p0_flag reset are performed in order from the message (a). Also according to the second embodiment, the operation by the start node is the same as the operation shown in FIG. 7. However, according to the second embodiment, after the information on the first route is obtained and before the operation in step S4 is performed, the resource reservation message 50 for setting a flag to be used for recognizing the links included in the first route is transmitted along the first route (A-B-C-Z). Like other signaling messages, the resource reservation message 50 is created by the message generator 24 and is transmitted by the message transmitter 12.

Figure 20A:
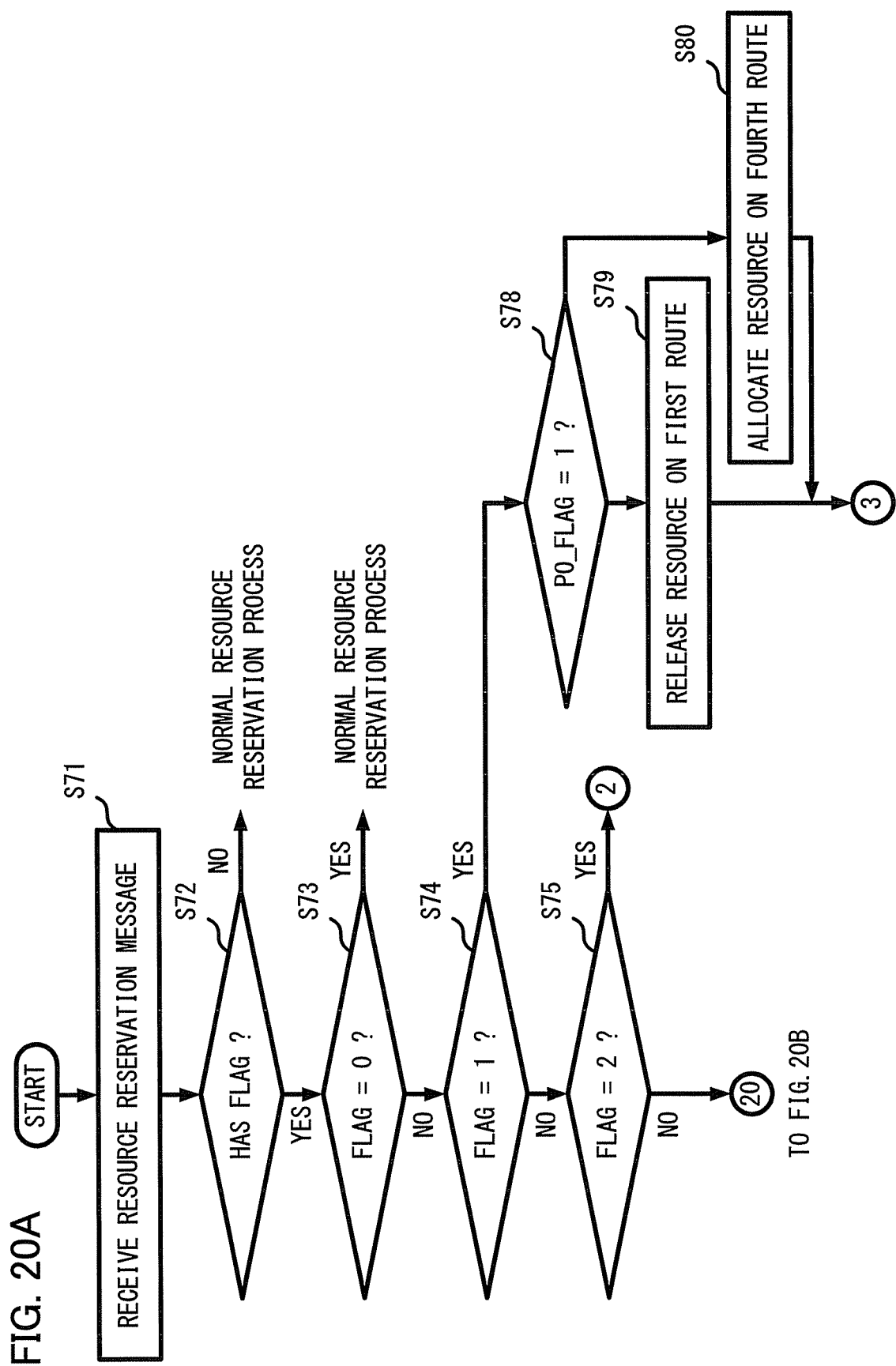

FIGS. 20A-20B are flowcharts illustrating the resource reservation method using the p0_flag and includes an operation to be performed by the node having received the resource reservation message 50. Now, the node operation by the node B, for example, will be described.

If the resource reservation message is received, the message identifying part 21 recognizes the type of the resource reservation message from the flag (steps S71 to S77). In the resource reservation method using the p0_flag, the message received by the node B first is the resource reservation message 50, and the flag 53 is set as "flag=3". Accordingly, the resource controller 22 and message processor 23 sets the flag (p0_flag) for identifying the links included in the first route by the method described with reference to FIG. 18 (steps S76 and S81). After the setting is finished, the p0_flag table has the condition in FIG. 18. Then, the message generator 24 generates a signaling message to be transmitted to the node C positioned on the end point side of the first route, and the message transmitter 12 transmits the message (steps S59 and S60 in FIG. 14).

After the signaling by using the resource reservation message 50 ends, the resource reservation and release by using the resource reservation message 30 shown in FIG. 8 are performed next. Because, in the resource reservation message 30, the flag 33 is set as "flag=1" as described with reference to FIG. 8, the processing moves to step S78 (steps S71 to S74).

If the fact that the resource reservation message 30 has been received from the message identifying part 21 is notified, the message processor 23 checks the p0_flag table and determines from the setting of the p0_flag of the target link whether the target link is included in the first route or not (step S78). If p0_flag=1, the target link is included in the first route. Therefore, the message processor 23 requests the resource controller 22 to release the resource (step S79). On the other hand, if p0_flag=0, the target link is not included in the first link. Therefore, the resource controller 22 reserves the resource of the target link as the resource of the fourth route (step S80). After the processing by the resource controller 22 finishes the resource reservation and release, the resource reservation message 30 is generated and is transmitted (steps S59 and S60).

Next, the resource reservation message 40 shown in FIG. 13 is used for allocating the reserved resource. In the resource reservation message 40, the flag 43 is set as "flag=2" as shown in FIG. 13. Therefore, the processing moves from step S75 to step S56 shown in FIG. 14B (steps S71 to S75). In the determination in step S56, the message processor 23 is not required to search the first route and compare it with the target link but may refer to the p0_flag table to check the value of the p0_flag. The operation in steps S57 to S60 is the same as that described with reference to FIG. 14B.

After the resource allocation, the signaling using the resource reservation message 60 is performed. The node having received the resource reservation message 60 changes the p0_flag table (steps S71 to S77, step S82 and steps S59 and S60). However, the signaling using the resource reservation message 60 is not required performing immediately after the signaling using the resource reservation message 40. In order to prevent the effect on the settings of other redundant routes, it may only be required to perform before the start of duplexing the routes without redundant configurations for other lines.

In this way, because the links included in the first route can be identified by checking the p0_flags, the necessity for each node to check whether the target link is included in the first route or not may be eliminated in the resource reservation. Therefore, for the resource reservation and/or allocation, the processing load on nodes can be reduced.

Third Embodiment

According to the first and second embodiments, the resource reservation is performed for the fourth route, and the reserved resource is then allocated to the second route and third route. However, without the resource reservation for the fourth route, the resource can be reserved for the second route or third route. In this case, signaling is performed by using two types of messages of:

(a) resource reservation message 70 to be used for resource reservation and release; and (b) resource reservation message 80 to be used for resource allocation on a first route.

[Resource Reservation and Release]

Figure 21:
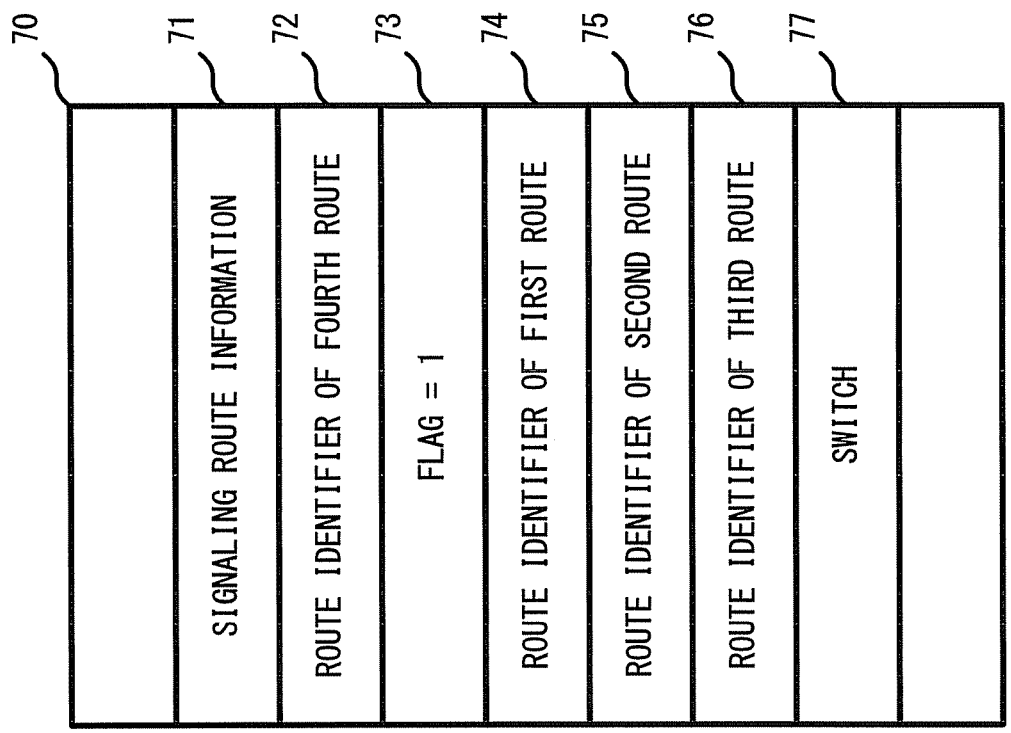
FIG. 21 is a diagram showing an example of the format of the resource reservation message to be used in the third embodiment.

FIG. 21 is a diagram showing an example of the format of the resource reservation message 70 to be used for resource reservation and release. The resource reservation message 70 includes signaling route information 71, a route identifier 72 of the fourth route, a flag 73, a route identifier 74 of the first route, a route identifier 75 of a second route, a route identifier 76 of the third route and a switch 77. Because the resource reservation message 70 includes the route identifiers for identifying the first route to fourth route, the node having received the resource reservation message 70 can reserve the resource of the target link as the resource included in the second route, for example.

The signaling route information 71 includes information on the fourth route to be processed by the resource reservation message 70. Because the resource reservation message 70 is used for performing the resource reservation and release, like the resource reservation message 30, the flag 73 is set as "flag=1". The switch 77 is used for notifying the node having received the resource reservation message 70 of either second route or third route including the target link to be processed. The switch 77 and the route including the target link to be processed can be associated arbitrarily. The following description assumes that, if the switch 77 is set at "1", the target link is processed as the link included in the second route, and if it is set at "0", the target link is processed as the link included in the third route. The setting of the value of the switch 77 and changing the setting will be described below.

(1) In the start node, the value of the switch 77 is set such that the resource reservation for the third route can be allowed. It is assumed here that, in the start node A, the resource reservation message 70 in which the switch 77 is set as "switch=0" is generated.

(2) Because the resource reservation message 70 is used for the signaling along the fourth route, the resource reservation message 70 is transmitted in order of "A-F-E-D-C-B-G-H-I-Z". Because "A-F-E-D-C" is included in the third route, the value of the switch 77 keeps "0", and the nodes A, F, E and D reserve the resources of the link AF, link FE, link ED and link DC as the resource to be used for the third route.

(3) The node C receives the resource reservation message 70 from the node D. The target links of the node C are the link DC and the link CB. The link DC is included in the third route, as shown in FIG. 1C. On the other hand, the link CB is included in the first route but is not included in either second route or third route. Accordingly, the node C releases the resource of the link CB. After the resource reservation for the link DC ends, the node C changes the setting of the switch 77 to "1".

(4) The node B receives the resource reservation message 70 from the node C. Because the switch 77 at that time is set at "1", the node B and subsequent ones reserve the resources as the second route. The node B and subsequent ones in the fourth route are "B-G-H-I-Z" and are a part of the second route shown in FIG. 1D.

In this way, the value of the switch 77 is changed autonomously in the links, which are not included in either second route or third route, in the fourth route. As shown in FIG. 1E, in the fourth route, if the starting point side about the section included in the first route is included in the second route, like the link CB, the end point side is included in the third route. In other words, the second route and the third route are connected across the section included in the first route. Therefore, by changing the switch 77 if a link is detected which is included in the fourth route and the first route, one signaling message can be used to autonomously perform the resource reservation supporting the two routes. The link positioned at the boundary of the second route and the third route, like the link CB, may sometimes be called "boundary link" herein. The node connected by the boundary link, like the node C or the node B, may sometimes be called "boundary node" positioned at the boundary of the second route and the third route.

Next, the operation to be performed by a node when the resource reservation method using the resource reservation message 70 is applied will be described. The operation by the start node is the same as the operation shown in FIG. 7. However, a first signaling message to be generated by the start node A is the resource reservation message 70 herein.

FIGS. 22A to 22D are diagrams illustrating the operation by a node for the resource reservation according to the third embodiment. Now, with reference to FIGS. 22A and 22B, the nodes C and B will be used, for example, to describe the node operation. If the start node A performs the signaling along the fourth route and the node C receives the resource reservation message 70 from the node D, the message identifying part 21 performs the flag determination as described above. Because the resource reservation message 70 has the setting "flag=1", the processing moves to step S96 (steps S91 to S94). The resource controller 22 determines whether the target link is a link included in the first route or not. If it is a link included in the first route, the resource of the target link is released (steps S96 to S98).

On the other hand, if the target link is not included in the first route, it is a link included in the second route or third route. Therefore, the resource reservation is performed. In this case, the message processor 23 checks the switch 77 of the resource reservation message 70 (step S99) before the resource reservation. Because the resource reservation message 70 received by the node C has the switch 77 set as "0", the resource of the link DC is reserved as the resource to be used for the third route (step S101).

As described above, the target links of the node C are the link DC and link CB. In the node C, the link DC, which is the target link on the starting point side of the signaling route (which is the fourth route), is not included in the first route. The link CB, which is the target link on the end node side, is a link included in the first route. Accordingly, the message processor 23 determines that it is the node for which the setting of the switch 77 is to be changed (steps S102 and S103). The message processor 23 notifies the message generator 24 of the determination result. On the basis of the notification from the message processor 23, the message generator 24 changes the setting of the switch 77 from "0" to "1" in creating the resource reservation message 70 to be transmitted to the node B (step S104). The message transmitter 12 transmits the created resource reservation message 70 to the node B (steps S112 and S113).

If the node B receives the resource reservation message 70 from the node C, the message identifying part 21 therein performs the determination in steps S91 to S94. In steps S96 and S97, the message processor 23 determines whether the reservation target link is included in the first route or not. The target links of the node B are the link CB (which is on the destination side) and the link BG (which is on the source side). The link CB is included in the first route. On the other hand, the link BG is included in the third route but is not included in the first route. Therefore, the resource controller 22 releases the resource allocated to the link CB (step S98).

Because the link BG is not included in the first route, the message processor 23 checks the setting of the switch 77 (step S99). Because it is after the node C has changed the setting of the switch 77 to "1", the resource is allocated to the link BG to be handled as a link included in the second route (step S100).

If the resource release and reservation end, it is determined whether the setting of the switch 77 is required to change or not (steps S102 to S104). Because, in the node B, the link CB, which is the target link on the starting point side of the signaling route, is included in the first route, it is determined that the setting of the switch 77 is not required to change (step S102). Then, the message generator 24 generates the resource reservation message 70 without changing the setting of the switch 77, and the message transmitter 12 transmits it to the node G (steps S112 and S113).

[Allocation of Resource Included in First Route]

Figure 23:
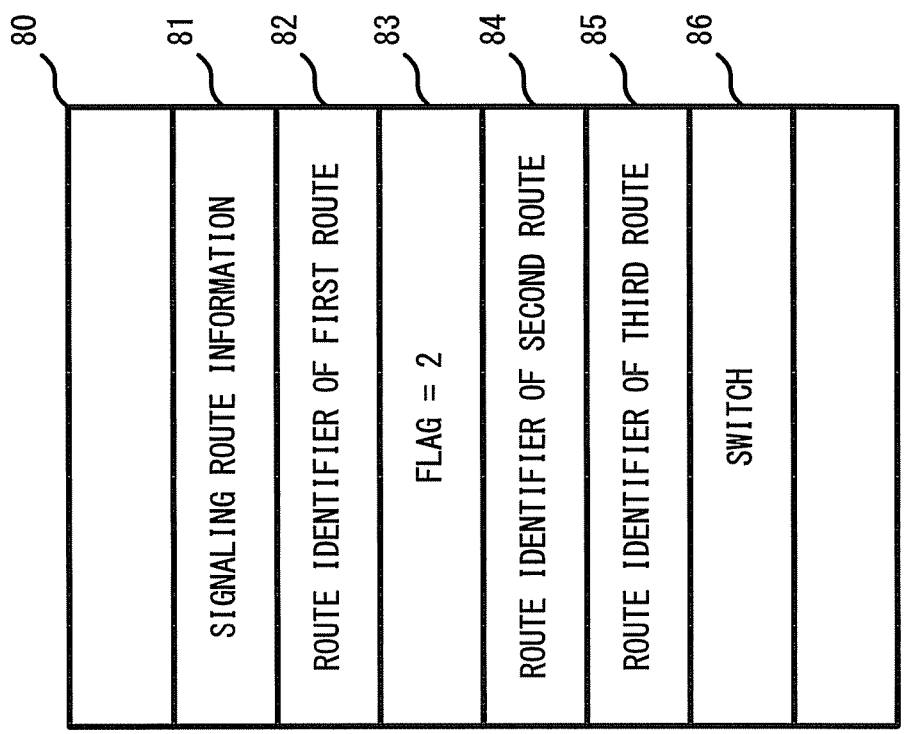
FIG. 23 is a diagram showing an example of a resource reservation message to be used for the allocation of a resource included in the first route.

FIG. 23 is a diagram showing an example of a resource reservation message 80 to be used for the allocation of a resource included in the first route after the resource reservation message 70 is used to perform the resource reservation and release. The resource reservation message 80 includes signaling route information 81, a route identifier 82 of the first route, a flag 83, a route identifier 84 of the second route, a route identifier 85 of the third route and a switch 86. Because the resource reservation message 80, like the resource reservation message 40 (FIG. 13), is used for the resource allocation, the flag 83 is set as "flag=2". The switch 86 is used for notifying the node having received the resource reservation message 80 of whether the resource included in the first route is to be processed as a link included in one of the second route and the third route or not.

The setting method for the switch 86 and the method for changing the settings are the same as those for the switch 77. However, the switch 86 in the start node A always has the opposite setting to the setting of the switch 77. For example, it is assumed that the switch 77 is set as "switch=0" in the resource reservation message 70 transmitted from the start node A through a fourth route. In this case, the start node A sets the switch 86 as "switch=1" in the resource reservation message 80 transmitted along the first route. The limitation allows the allocation of the resource of the third route from the start node A in the direction of link AF and allocation of the resource of the second route from the start node in the direction of link AB and provides the two routes.

Figure 22A:
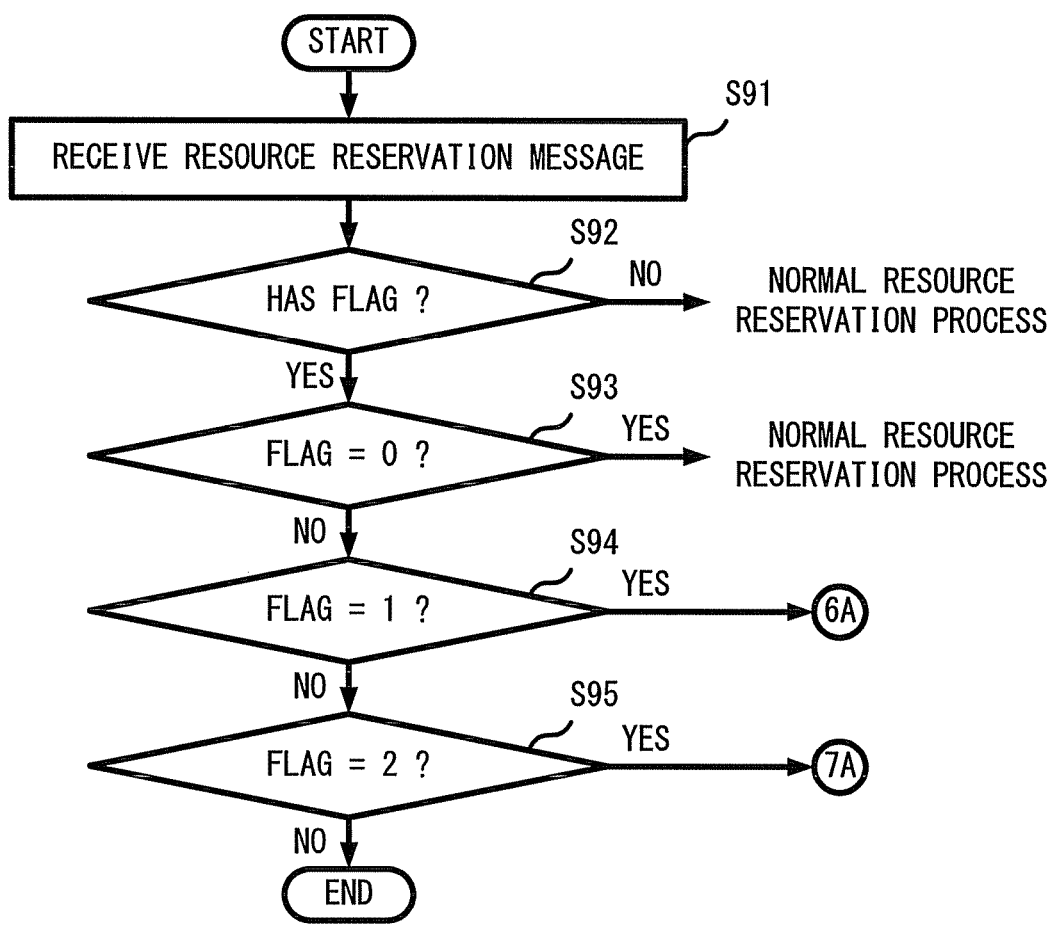
FIGS. 22A-22D are flowcharts illustrating the operation by the node having received the resource reservation message according to the third embodiment.
Figure 22B:
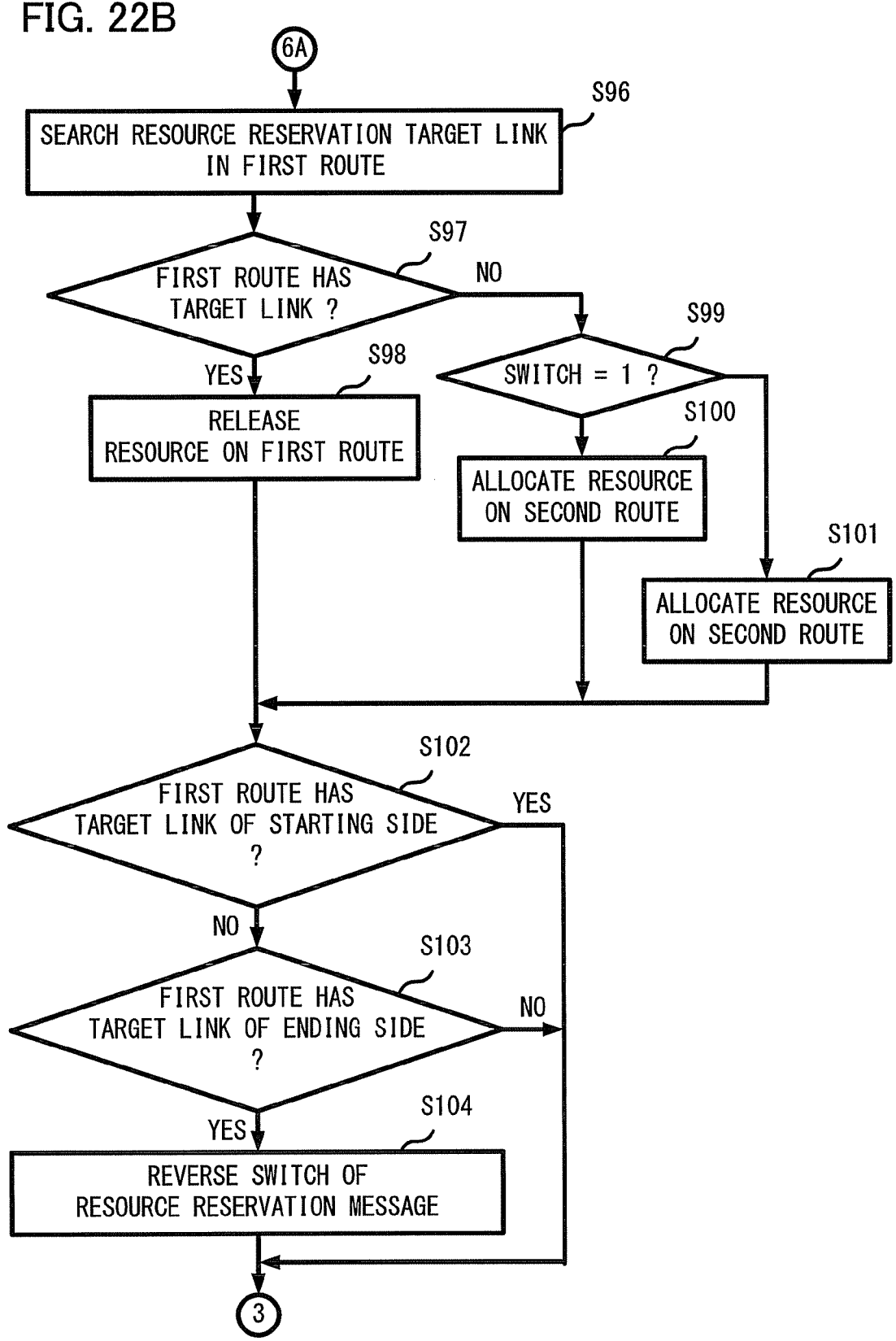
Figure 22C:
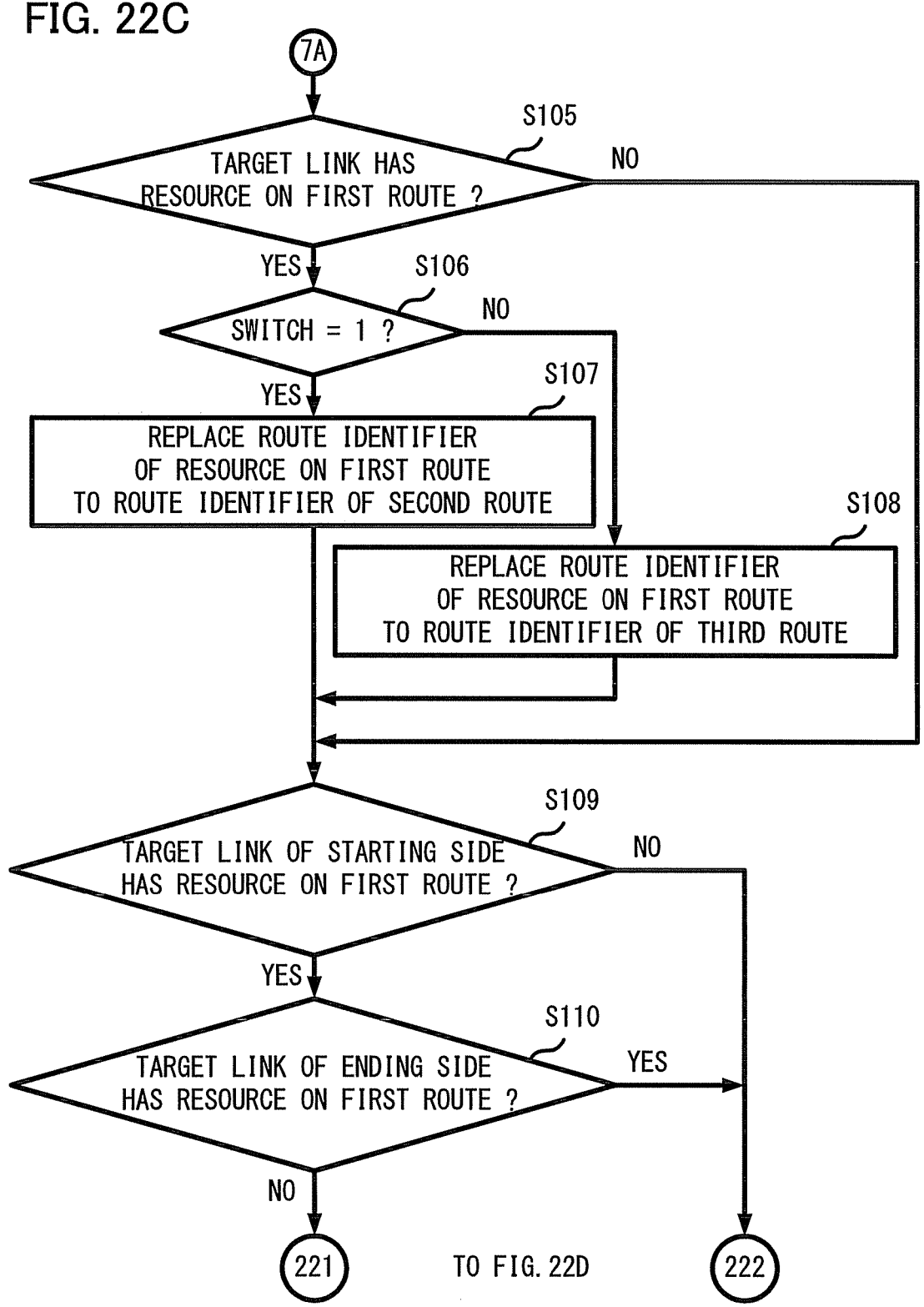
Figure 22D:
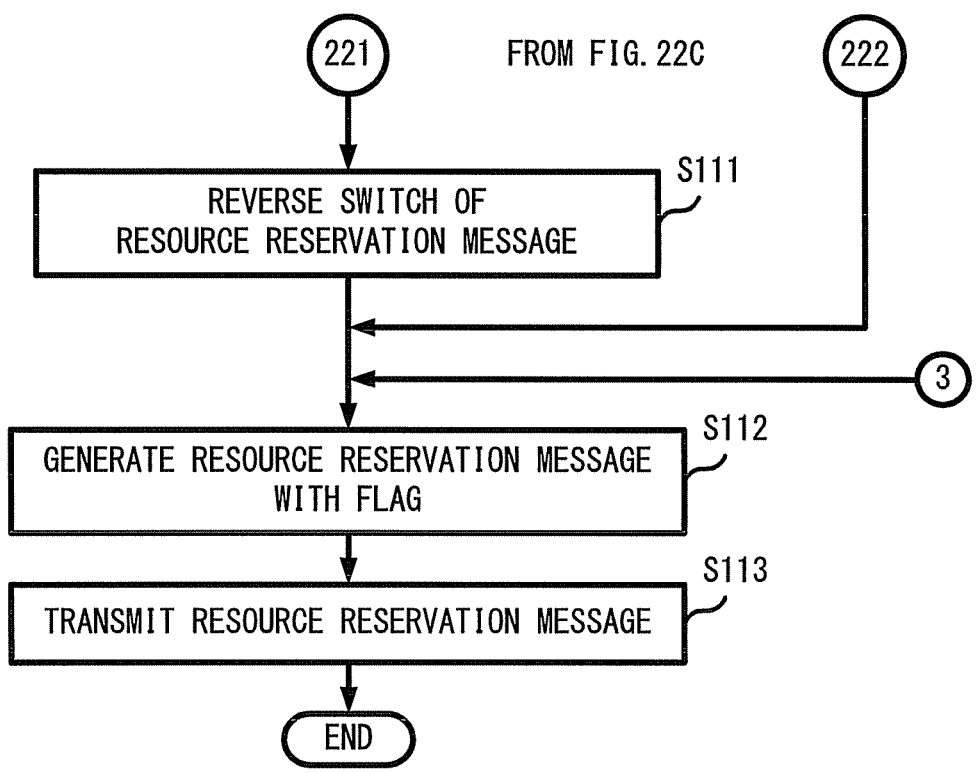

Next, with reference to FIGS. 22A, 22C and 22D, the method for dividing the resource included in the first route will be described. The operation of the start node A is the same as the one described with reference to FIGS. 12A and 12B except that the message generated by the start node A is the resource reservation message 80. Here, the nodes B and C will be used, for example, to describe the node operation. The resource reservation message 80 is transmitted along the first route (A-B-C-Z). It is assumed that the start node A generates the resource reservation message 80 having the switch 86 set as "switch=1" and that the node B receives the resource reservation message 80. In this case, the message identifying part 21 in the node B performs the flag determination as described above. Then, the processing moves to step S105 (steps S91 to S95).

In the node B, the message processor 23 determines whether the target link of the node B has the resource of the first route or not. At that time, from the link, which is included in the fourth route, in the first route, the resource has already been released when the resource reservation using the resource reservation message 70 is performed. Then, the message processor 23 with reference to the route list 26 determines whether any route identifier for identifying the first route is included in the route identifiers of the routes accommodated in the target link or not (step S105).

Comparing among FIGS. 1B to 1E, the resource of the link BC in the first route is released. Therefore, the target link of the node B is the link AB. Then, the message processor 23 refers to the setting of the switch 86. Because it is "switch=1" here, processing is performed for replacing the route identifier of the resource included in the first route by the route identifier of the second route (steps S106 and S107).

If the replacement of the route identifier ends, whether the setting of the switch 86 is required to change or not is determined (steps S109 to S111). The processing here is the same as the one in steps S102 to 104 described with reference to FIG. 22B. If the target link on the starting point side has the resource included in the first route and if the target link on the end point side does not have the resource included in the first route, the setting of the switch 86 is changed. In the case of the node B, the link AB, which is the target link on the starting point side, is included in the first route, and the resource accommodated in the link BC on the end point side is released. It satisfies the requirement for changing the setting of the switch (steps S109 and S110). Accordingly, the message generator 24 generates the resource reservation message 80 including the switch 86 changed the current set value "1" to "0" and the resource reservation message 80 is transmitted to the node C (steps S111 to S113).

In the node C having received the resource reservation message 80 after the flag determination, whether the target link has the resource included in the first route or not is determined (steps S91 to S95 and step S105). Because the target links in the node C are the link BC and the link CZ and the resource accommodated in the link BC is released, the resource of the link CZ only exists. Because the resource reservation message 80 received by the node C is set as "switch=0", the resource controller 22 allocates the resource of the link CZ to the third route (steps S106 and S108). If the resource allocation ends, whether the setting of the switch 86 is required to change or not is determined. Because the resource of the first route is released in the link BC, which is the target link on the starting point side, the node C generates the resource reservation message 80 to be transmitted to the end node Z and transmits it, without changing the setting of the switch 86 (steps S109 to S113).

In this way, because the resource reservation along the fourth route allocates the resource as that of the second route or the third route, the resource allocation is performed only for the link or links included in the first route. This can eliminate the necessity for the signaling for performing the resource allocation for both of the second route and the third route, and the signaling for the first route is only required. As a result, the number of signaling outputs for resource replacement can be reduced.

A node autonomously changes the setting in the switch field in the resource reservation message so that which of the second route and third route the resource is belongs to can be autonomously set. Thus, the route setting can be performed easily.

Notably, having described the case where only one boundary link exists in the fourth route, there is a possibility that plural boundary links are included in the fourth route. Even when plural boundary links exist in the fourth route, each of the boundary links connects the second route and the third route. Therefore, even when plural boundary links exist in the fourth route, the value in the switch field may be changed as described above in each of the boundary links so that the resource can be reserved autonomously and separately for the second route and the third route. In other words, the resource reservation method as follows can be implemented.

There may be provided a resource reservation method in which, in a network, a resource is allocated to a first route, and a second route and third route are given that connect between the start node of the first route and the end node of the first route, the method including:

defining a fourth route including links resulting from the exclusion of the links which are common to the first route and the second route and links which are common to the first route and the third route from the links included in the first route, the second route or the third route;

reserving a resource of the link included in the fourth route;

generating the second route and the third route from the resource on the first route and the reserved resource on the fourth route;

detecting a boundary link, which does not belong to any of the second route and the third route, in the fourth route;

if plural boundary links are detected in the fourth route, reserving, for the third route, the resources on the fourth route from the starting point of the fourth route to the first boundary link relative to the starting point of the fourth route, and reserving, for the third route, the resources on the fourth route from an even-numbered boundary link relative to the starting point of the fourth route to an odd-numbered boundary link relative to the starting point of the fourth route;

reserving, for the second route, the resources on the fourth route from an odd-numbered boundary link relative to the starting point of the fourth route to an even-numbered boundary link relative to the starting point of the fourth route;

if a first final boundary link indicative of the boundary link that is the closest to the end point of the fourth route is an even-numbered boundary link relative to the starting point of the fourth route, reserving the resources, for the third route, from the first final boundary link to the end point of the fourth route, and, if the first final link is an odd-numbered boundary link relative to the starting point of the fourth route, reserving the resources, for the second route, from the first final boundary link to the end point of the fourth route;

allocating the second route the resources from the starting point of the first route to the first boundary link relative to the starting point of the first route in the resources allocated to the first route and allocating the second route the resources, on the first route from an even-numbered boundary link relative to the starting point of the first route to an odd-numbered boundary link relative to the starting point of the first route;

allocating the third route the resources from an even-numbered boundary link relative to the starting point of the first route to an odd-numbered boundary link relative to the starting point of the first route in the resources allocated to the first route; and if a second final boundary link indicative of the boundary link that is the closest to the end point of the first route is an even-numbered boundary link relative to the starting point of the first route, allocating the second route the resources from the second final boundary link to the end point of the first route, and if the second final link is an odd-numbered boundary link relative to the starting point of the first route, allocating the third route the resources from the second final boundary link to the end point of the first route.

Fourth Embodiment

According to the third embodiment, as described above, one signaling output causes the allocation of the resource of the first route to the second route and third route. Therefore, the destination of the allocation of the resource must be switched between the second route and the third route at some point in the first route. Therefore, the setting of the switch 86 is changed. By the way, as described above, the second route and the third route are connected across a boundary link included in the first route. Therefore, in generating the second route and third route, the setting of the switch must be changed at the boundary link part for both of the signaling for the resource reservation along the fourth route and the signaling for the resource allocation along the first route.

Furthermore, the setting of the switch 77 is changed in the signaling along the fourth route before the setting of the switch 86 is changed in the signaling along the first route. Therefore, the node where the setting of the switch 77 is changed is recorded in the signaling along the fourth route so that, at the node, the setting of the switch 86 can be changed in the message used for the signaling along the first route. In this case, the necessity for determination on whether the setting of the switch is to be changed or not (step S109 to S111) may be eliminated in resource allocation, which can reduce the processing loads at nodes.

As described according to the third embodiment, while the switch 77 is changed at the node C in the signaling along the fourth route, the switch 86 is changed at the node B in the signaling along the first route. However, for both of the signaling outputs, the setting of the switch may be changed at either node B or node C because the resource reservation for the second route and third route is only required. Therefore, without problems, the switch 86 included in the message used for performing the resource allocation may be changed at the node C.

According to the fourth embodiment, in the resource reservation message 70 for performing the resource reservation, the node where the setting of the switch 77 is changed is stored with a change node flag. The change node flag is stored in a storage device such as a memory at each node and has an initial value "0". The change node flag may have an arbitrary form that can record the node where the setting of the switch 77 is changed and may be a part of the route list 26 and/or resource management table 27. Upon signaling along the first route for reallocation of a resource after the resource reservation and release are performed, the change node flag stored in a node may be checked to change the switch 86.

Figure 24A:
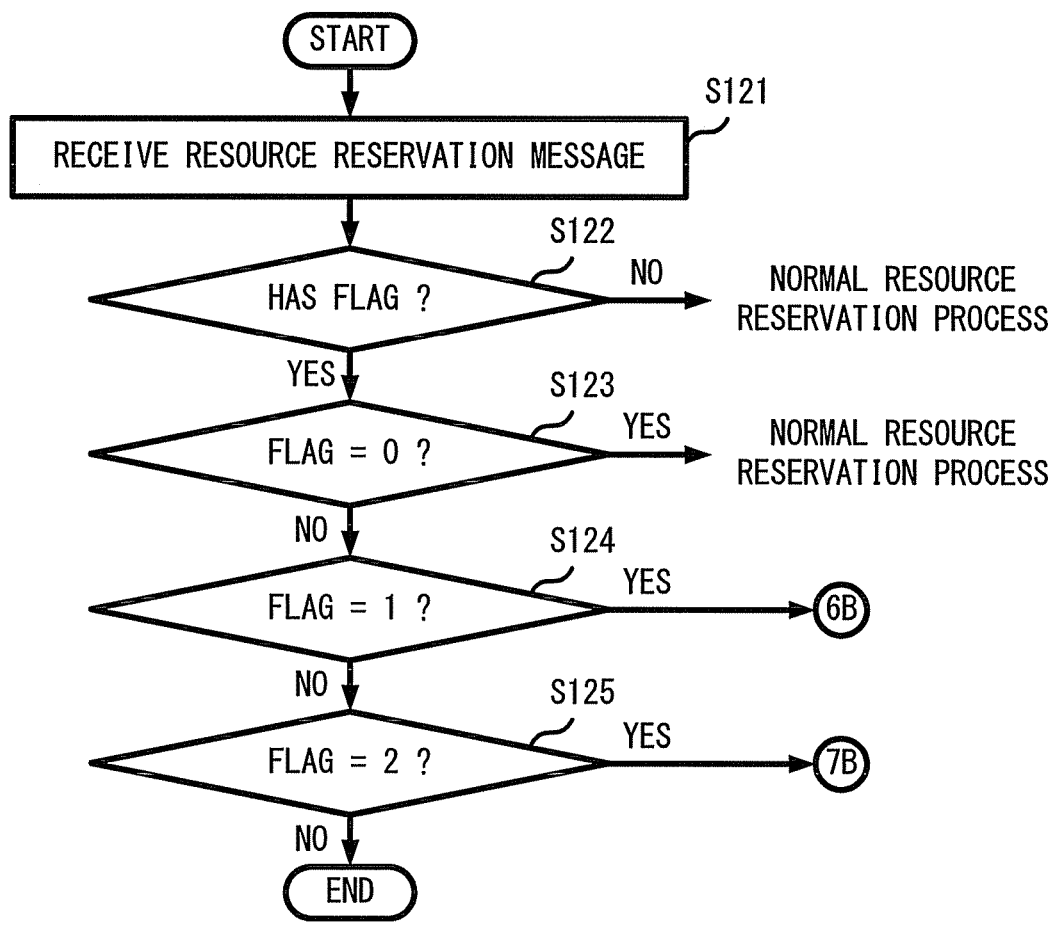
FIGS. 24A-24C are flowcharts illustrating the operation by the node having received the resource reservation message according to the fourth embodiment.
Figure 24B:
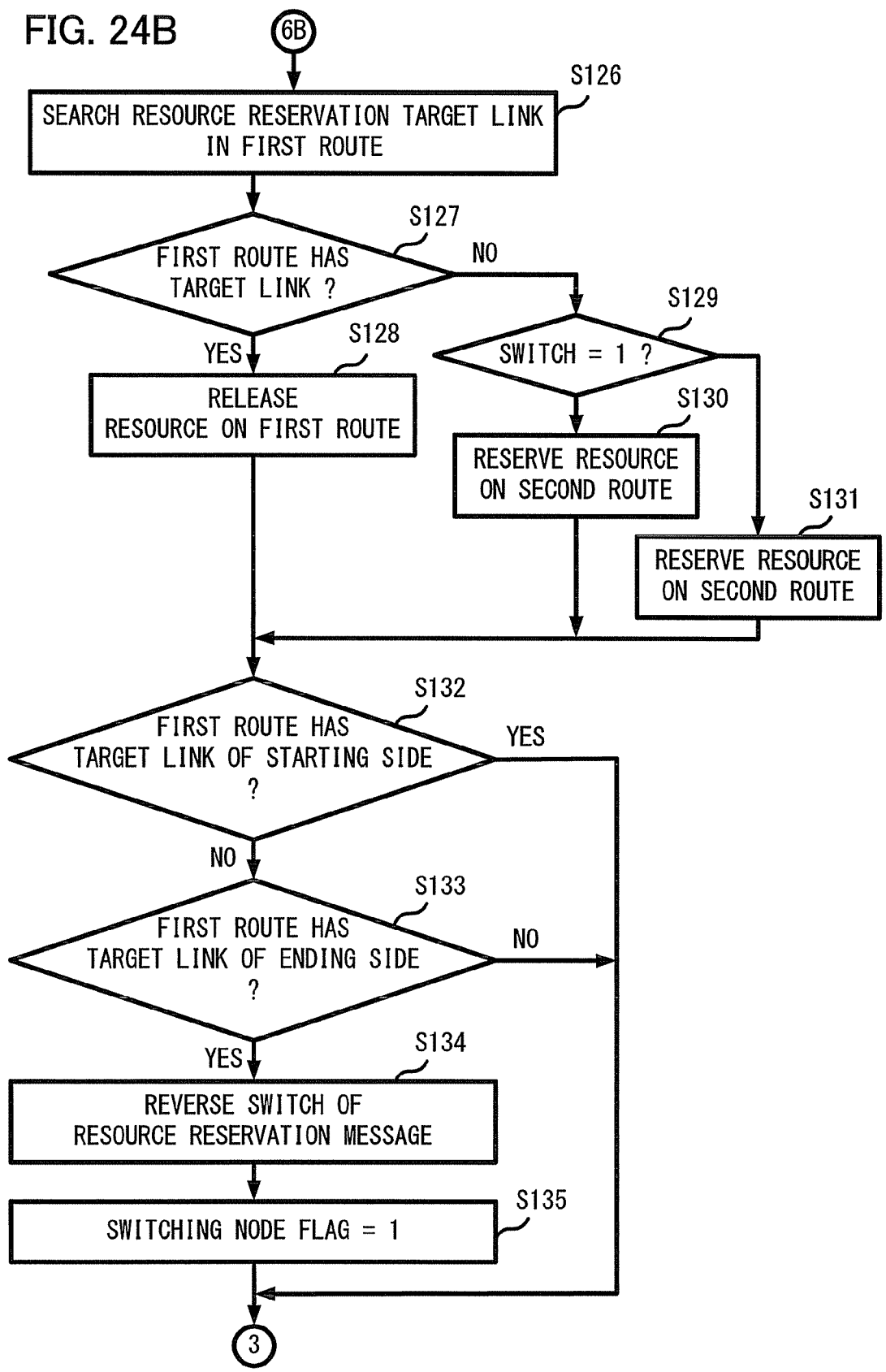
Figure 24C:
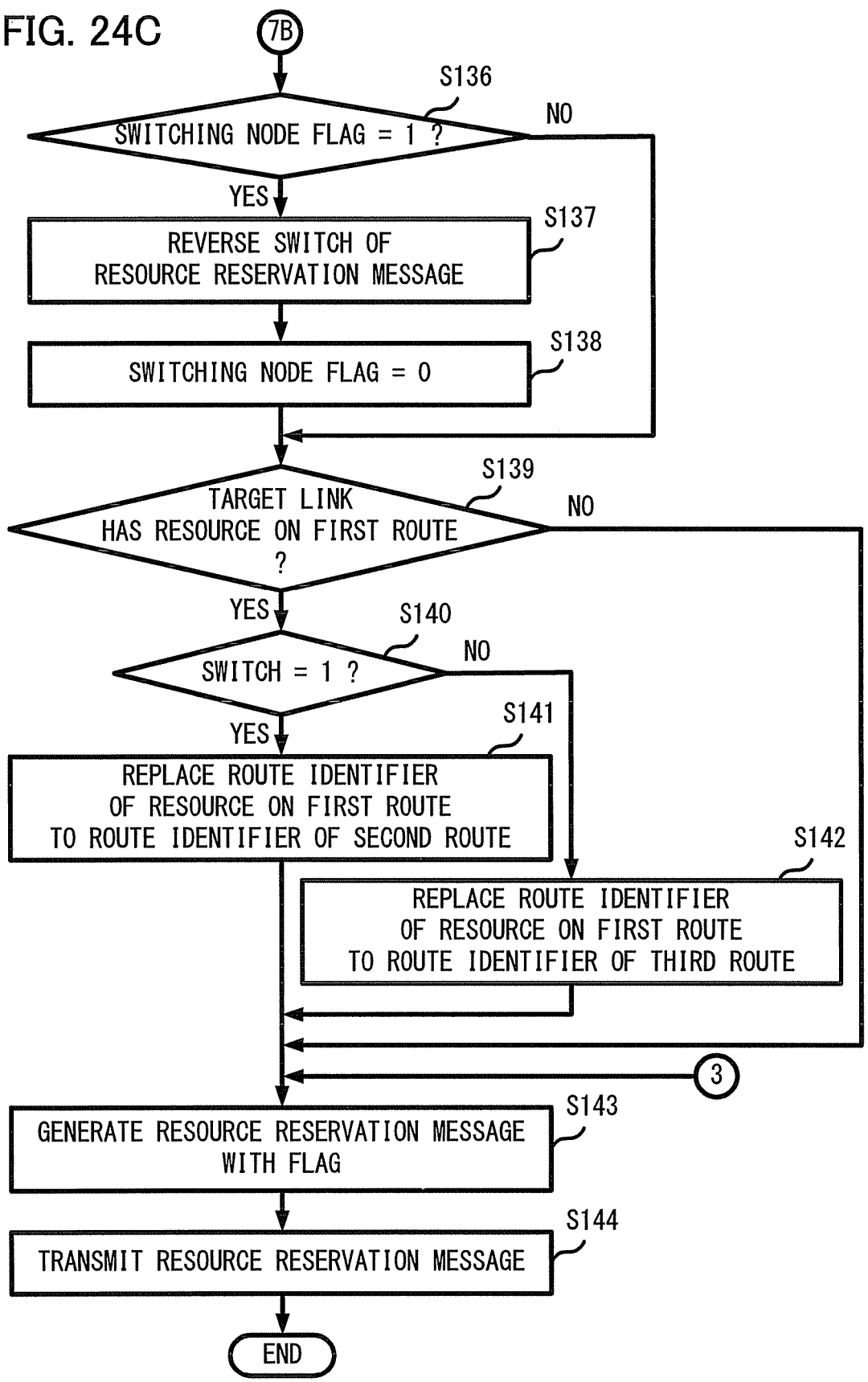

FIGS. 24A to 24C are diagrams illustrating examples of the operations in a node having received a resource reservation message according to the fourth embodiment. The operations to be performed according to the fourth embodiment are the same as those of the third embodiment except for the operation relating to the change node flag. First of all, if a node receives the resource reservation message, the message identifying part 21 checks the flag and notifies the processing to be performed to the message processor 23 and/or the resource controller 22 (step S121 to 125). If "flag=1", whether the target link is included in the first link or not is determined. If the target link is included in the first link, the resource is released. If not, the resource reservation is performed in association with the route included in the link (steps S126 to S131). After that, whether the switch 77 is to be changed or not is determined (steps S132 to S134). If the switch 77 is changed, the setting of the change node flag is changed from "0" to "1" (step S135). If the setting of the change node flag ends, the message is transmitted to the node on the end point side.

If the signaling for performing the resource reservation and release end, the resource allocation is performed along the first route. The message identifying part 21 in the node having received the resource reservation message 80 notifies the message processor 23 and the resource controller 22 of that the resource allocation is to be performed (steps S121 to S125). Before the resource allocation is performed, the message processor 23 checks whether the change node flag is set to "1" or not (step S136). If the change node flag is set to "1", the setting of the switch 86 is changed to "1" if it is "0" and is changed to "0" if it is "1". In other words, the setting is inverted (step S137). Next, the setting of the change node flag is reset to "0" (step S138). If the change of the switch 86 and the reset of the change node flag end, the resource allocation and the message transmission to the node on the end point side are performed (steps S139 to S144). The operations of the resource allocation and message transmission are the same as those described according to the third embodiment.

On the other hand, if the change node flag is "0", the resource allocation and the message transmission to the node on the end point side are performed without particularly changing the setting of the switch 86 (steps S139 to S144).

In this way, according to the fourth embodiment, the information on the destination of the resource reallocation between the second route and the third route is stored in a node on the first route before the resource allocation to the fourth route. Therefore, the information can be used in the signaling along the first route for resource reallocation to reallocate the resource either to the second route or the third route. As a result, the step can be omitted of determining the destination of the resource allocation between the second route and the third route from the route information in the signaling for the reallocation, which can reduce the processing load in the node. Notably, like the third embodiment, the fourth embodiment is also applicable to cases where the fourth route includes plural boundary links.

Fifth Embodiment

According to the second embodiment described above, in order to reset the p0_flag, signaling is performed along the first route by the resource reservation message 60, but a message specially for resetting the p0_flag (which will be called flag reset message) can also be used. The flag reset message is used for resetting the setting of the p0_flag regarding the adjacent node of each node.

The resource reservation method using the flag reset message includes three sequential types of:
1) signaling for setting the p0_flag along the first route;
2) signaling for the resource reservation and release along the fourth route; and
3) signaling for performing the resource allocation along the second route and third route.

After those types of signaling, the flag reset message 90 resets the setting of the p0_flag.

Figure 25:
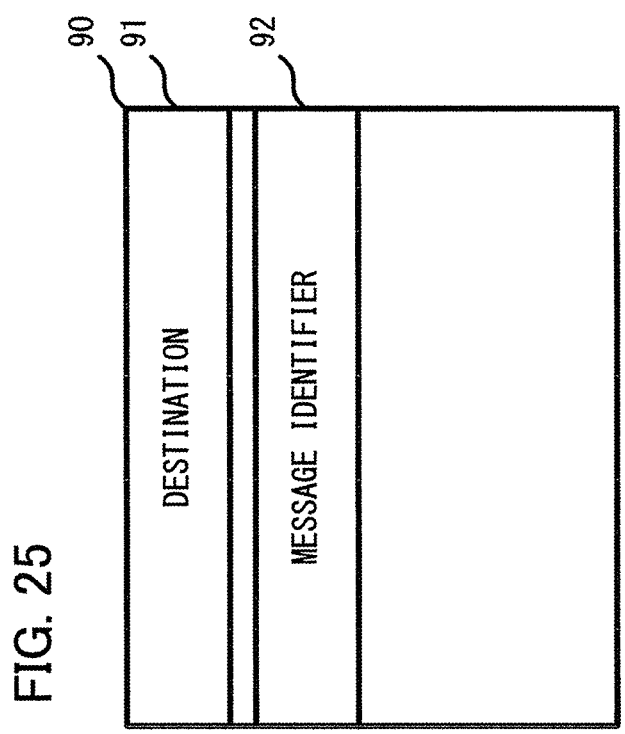
FIG. 25 is a diagram showing an example of the format of a flag reset message.

FIG. 25 is a diagram showing an example of the format of the flag reset message 90. The flag reset message 90 includes a destination address 91 and a message identifier 92. Because the flag reset message is a message to be transmitted to the adjacent node, it does not include signaling route information. The reception of the flag reset message 90 triggers the reset of the p0_flag. Therefore, the destination address 91 and the message identifier 92 for identifying that the message is the flag reset message are included therein. However, it may be a message further including other arbitrary information according to the implementation.

Figure 26A:
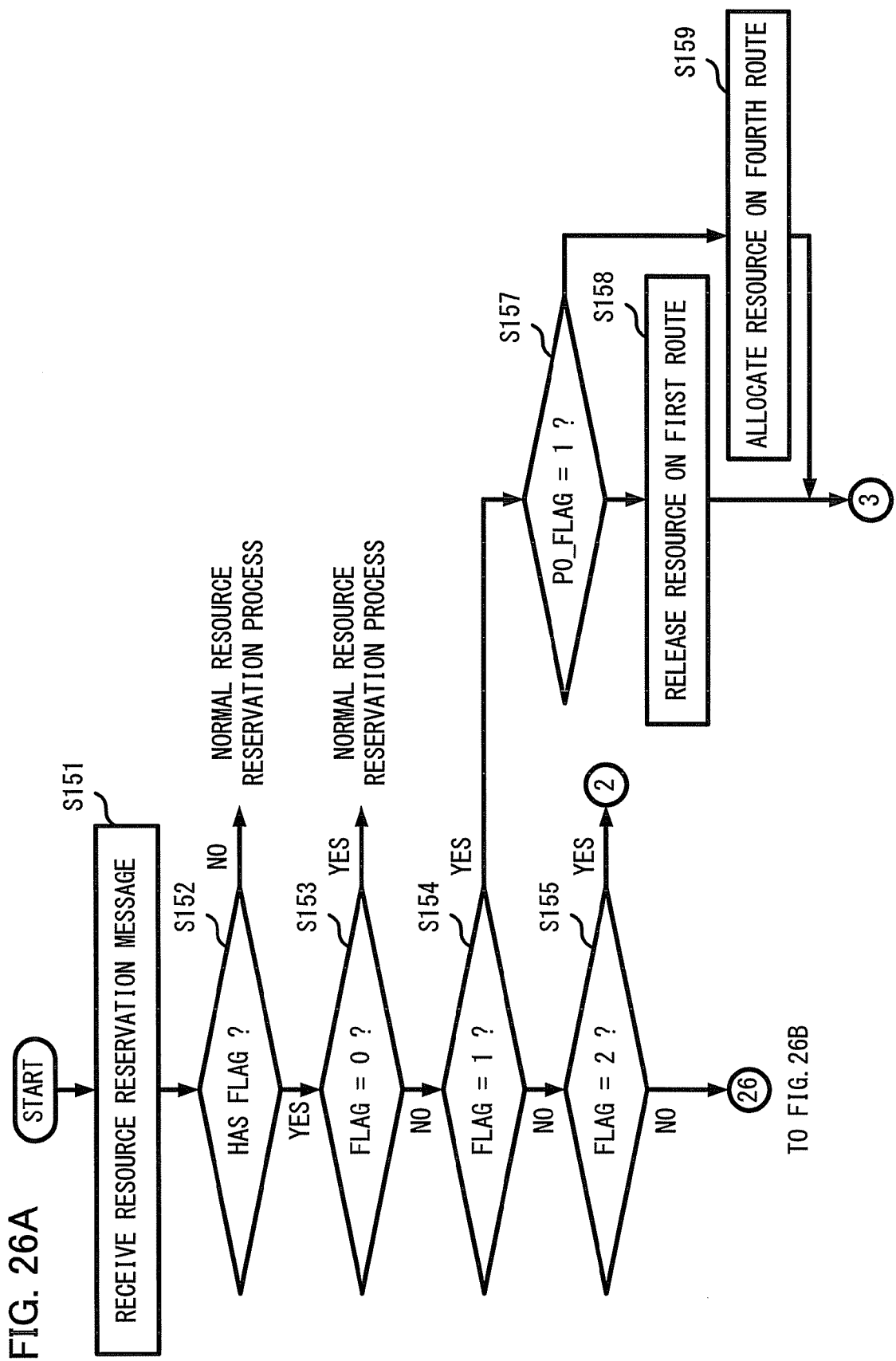
FIGS. 26A-26B are flowcharts illustrating the operation by a node in the resource reservation method using the flag reset message.
Figure 26B:
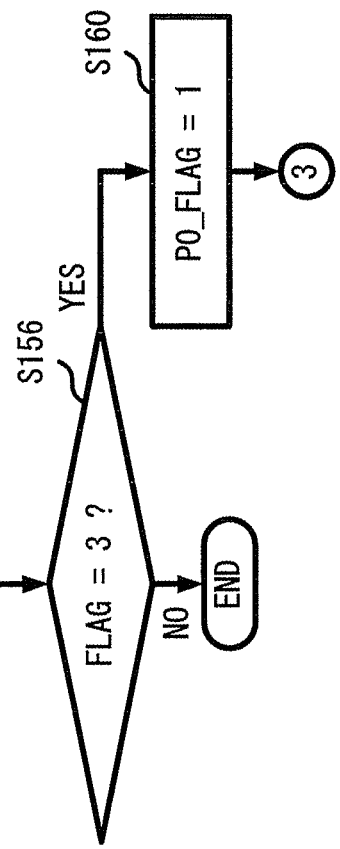

FIGS. 26A-26B are flowcharts illustrating the operation by a node in the resource reservation method according to the fifth embodiment. Except for no processing upon reception of the resource reservation message 60, the same operation is performed as the operation shown in FIGS. 20A-20B by each node according to the second embodiment. Because the flag reset message 90 is a different type of message from the resource reservation message, the message identifying part 21 does not determine the type of the flag as on the resource reservation message 60.

If the resource reservation message is received, the message identifying part 21 identifies the type of the flag and notifies the resource controller 22 and message processor 23 of the operation requested by the message (steps S151 to S156). The operation requested herein includes, as illustrated in FIGS. 26A-26B, normal resource reservation processing, processing for performing resource reservation and release, processing for performing resource allocation, or changing the setting of the p0_flag. If the resource reservation and release are requested, the message processor 23 or the resource controller 22 checks the setting of the p0_flag, releases the resource or resources of the link or links included in the first route and reserves the resource or resources of the link or links which is or are not included in the first route (steps S157 to S159). If the resource allocation is requested, the operation in steps S56 to S60, which has been described with reference to FIGS. 14A-14B according to the first embodiment, is performed. If changing the setting of the p0_flag is requested, it is changed to p0_flag=1 as described according to the second embodiment (step S160).

After the signaling for performing the resource allocation, the flag reset message 90 resets the p0_flag. In order to reset the p0_flag, according to the fifth embodiment, the flag reset message 90 is transmitted to all nodes adjacent to the start node. Next, the node having received the flag reset message 90 transmits the flag reset message 90 to the adjacent nodes excluding the source node of the flag reset message 90.

Figure 27:
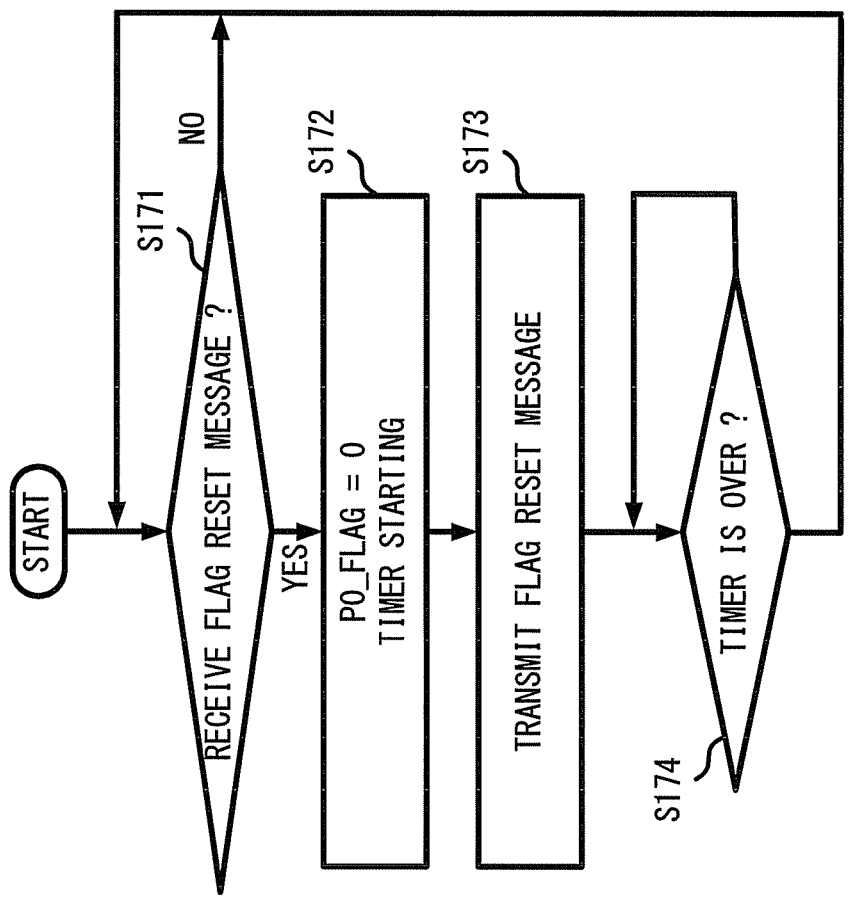
FIG. 27 is a flowchart illustrating the operation by the node having received the flag reset message.

FIG. 27 is a flowchart illustrating an operation by the node having received the flag reset message. Each of the nodes is on standby until it receives the flag reset message 90. On the other hand, the node having received the flag reset message 90 sets the p0_flag to "0" and starts a timer (steps S171 and S172). Next, the node transmits the flag reset message 90 to all of the adjacent nodes excluding the source node of the received flag reset message 90 and waits until the timer expires (step S173, 174). Until the timer expires, nothing is performed even if the next flag reset message 90 is received. If the timer expires, the node waits for the next flag reset message.

According to the fifth embodiment, because the node having received the flag reset message 90 transmits the flag reset message 90 to the adjacent node or nodes, the p0_flag is reset in all of the nodes in a network as a result. Therefore, even in the node where the p0_flag which should be set to "0" is kept at "1" due to a malfunction, for example, the p0_flag can be reset every time a redundant route is set. This can prevent the failure in setting a redundant route due to the improper setting of the p0_flag in a node in a network.

Because the p0_flag in all nodes in a network can be reset, the NMS, for example, may be used to adjust so as to prevent the simultaneous setting of plural redundant routes over the network. Thus, the route setting can be performed effectively.

Sixth Embodiment

Having described according to the second embodiment or the fifth embodiment that the signaling message and/or the flag reset message is/are transmitted to reset the p0_flag, it may be configured that the p0_flag is autonomously reset. This resource reservation method includes, like the fifth embodiment, three sequential types of:

1) signaling for setting the p0_flag along the first route;
2) signaling for resource reservation and release along the fourth route; and
3) signaling for performing resource allocation along the second route and third route.

In addition to those types of signaling, the setting of p0_flag is autonomously reset.

Figure 28A:
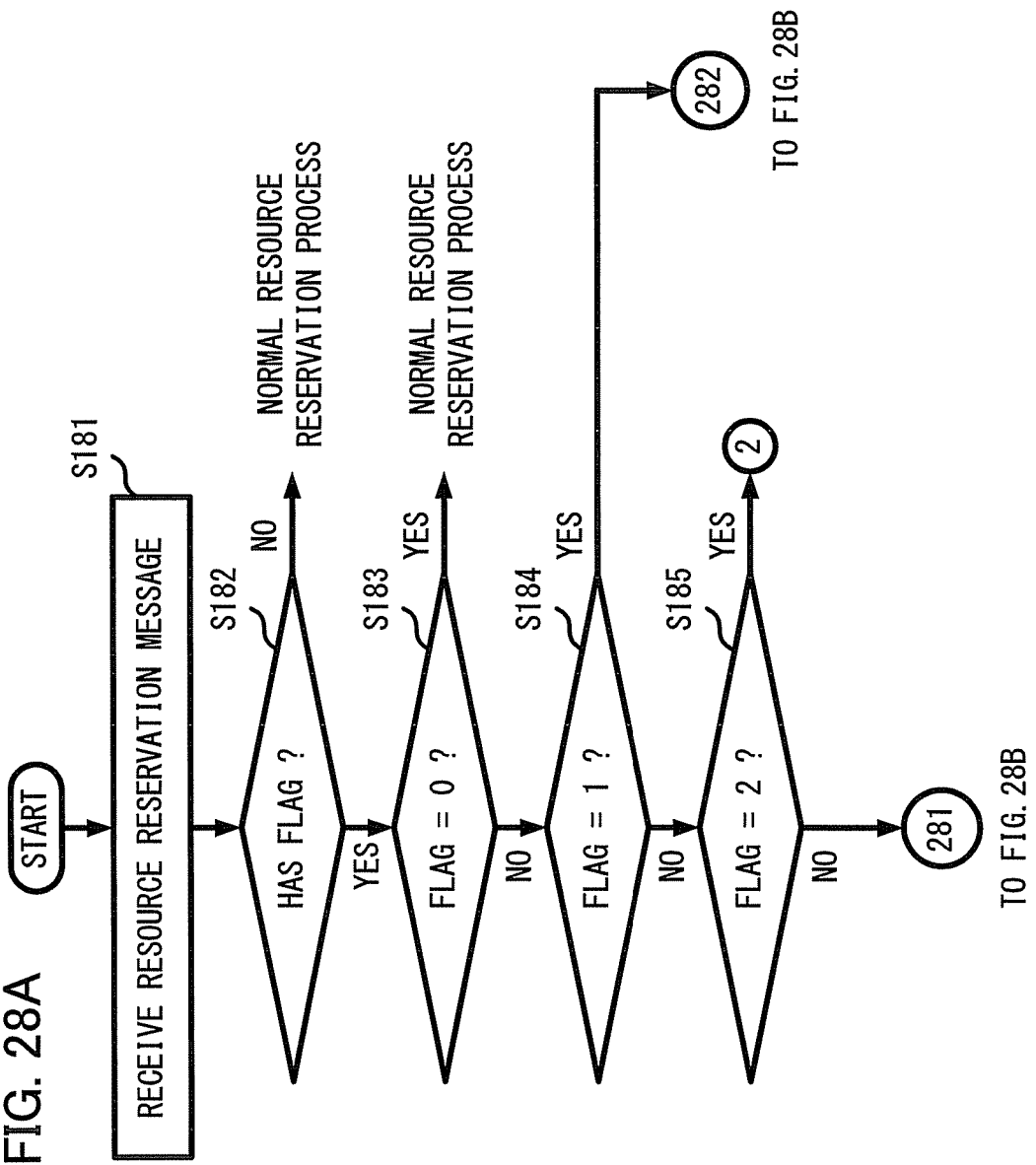
FIGS. 28A-28B are flowcharts illustrating another example of the operation by the node having received a resource reservation message according to the sixth embodiment.
Figure 28B:
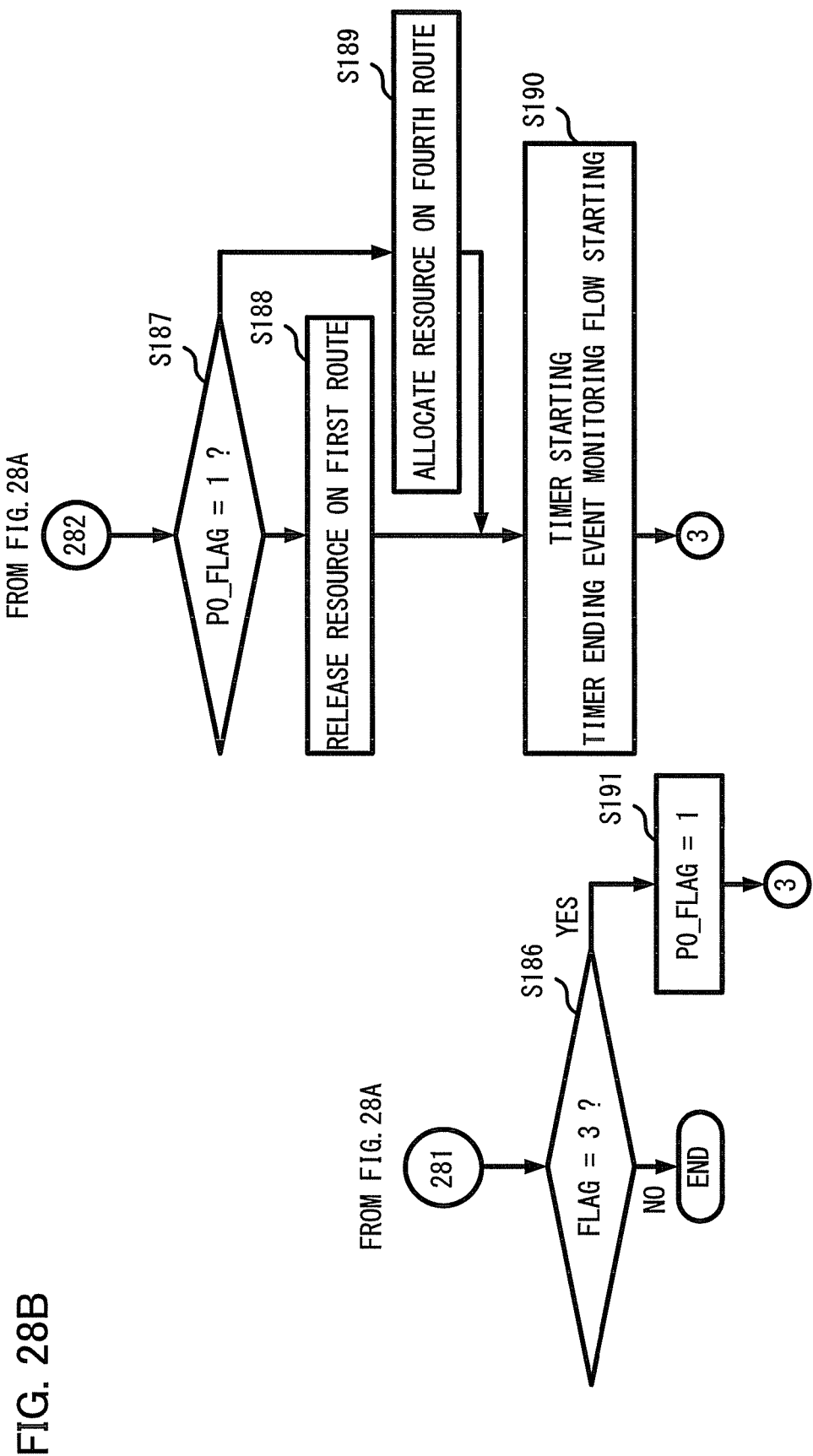

FIGS. 28A-28B are diagrams illustrating operations by the node having received a resource reservation message according to the sixth embodiment. After the resource reservation message is received, in the same manner as that described according to the fifth embodiment, for example, the message identifying part 21 analyzes the processing designated in the received message (steps S181 to S186), and the p0_flag is set (step S191).

In performing the resource reservation and release, whether the target link is included in the first route or not is determined in accordance with the setting of the p0_flag. If the target link is included in the first route, the resource is released. If it is not included in the first route, the resource reservation is performed (steps S187 to S189). The operation to be performed here is also the same as that of the fifth embodiment. After the resource release or resource reservation is performed, a timer is started, and a flow monitoring the time expiration event is started (step S190).

Figure 29:
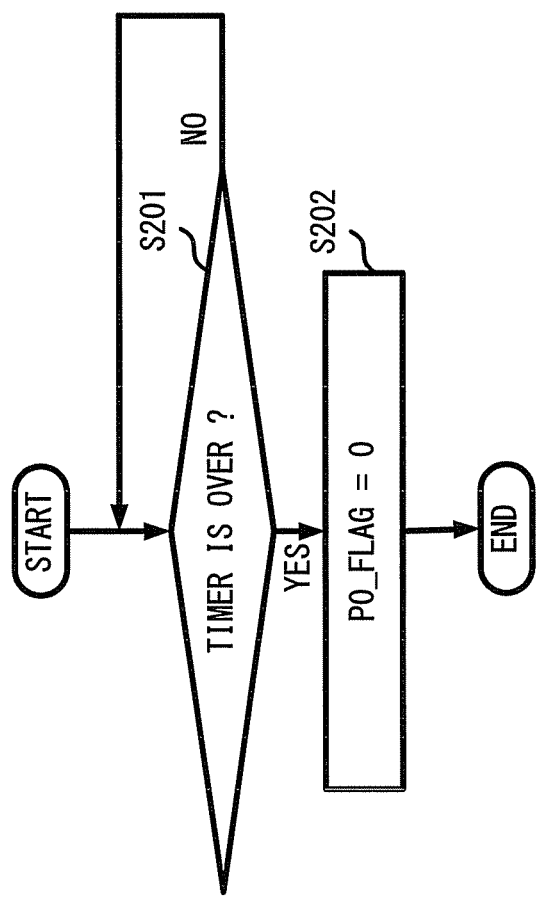
FIG. 29 is a flowchart illustrating the operation by a node when a flow monitoring the time expiration event is started.

FIG. 29 is a diagram illustrating the operation by a node when the flow monitoring the time expiration event is started. If the flow monitoring the time expiration event is started, the processing waits until the timer expires (step S201). At the expiration of the time preset in the timer, the p0_flag is reset to "0" (step S202).

After the signaling for performing resource reservation and release, the resource allocation is performed (steps S56 to S60). The operation to be performed in the resource allocation is the same as that described according to the first embodiment.

As described above, autonomously resetting the setting of the p0_flag at the expiration of the time preset in the timer can eliminate the necessity for message transmission to reset the setting of the p0_flag. Therefore, the p0_flag can be reset at various times in accordance with the settings of the timer. For example, a value that is extremely close to zero (0) may be set to the timer. Thus, the p0_flag can be reset immediately after resource reservation and release are performed, and the resource allocation can be performed after that. A long period of time may be set to the timer such that the resource allocation can be completed before the p0_flag is reset.

Notably, also according to the sixth embodiment, in order to set the timer in consideration of the settings of other redundant route to over a network, the NMS may be used to adjust the times for setting redundant routes. Therefore, the route setting can be performed effectively.

Seventh Embodiment

Having described according to the first to sixth Embodiments the network having a ring network topology shown in FIGS. 1A-1E, for example, the resource reservation method described up to this point is applicable even in a mesh network.

Figure 30:
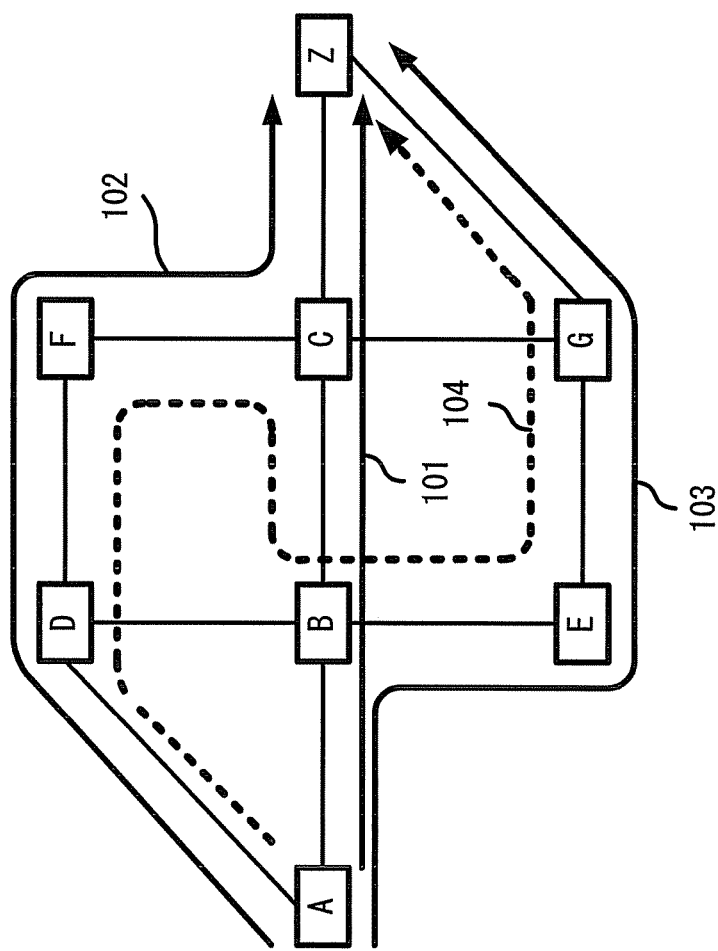
FIG. 30 is a diagram illustrating an example of the resource reservation to be performed in a network having a mesh configuration.
Figure 31B:
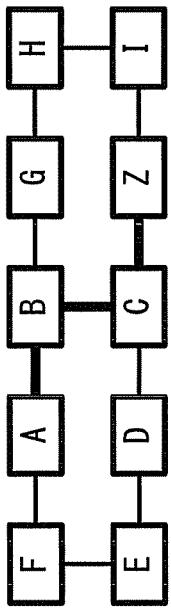
FIGS. 31A-31E are diagrams illustrating an example in a case where the original route is deleted when two node-redundant routes are to be set.
Figure 31D:
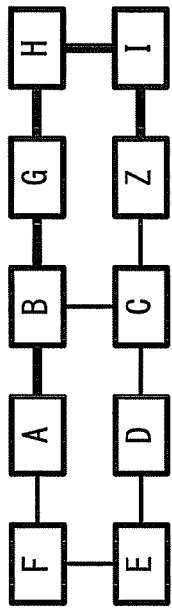
Figure 31A:
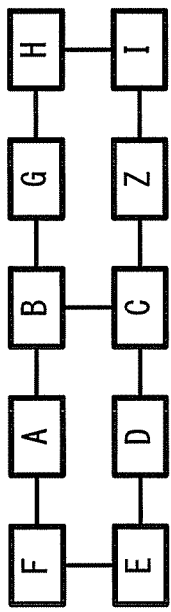
Figure 31C:
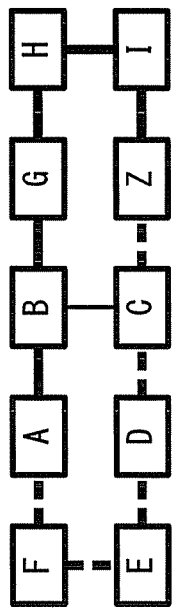
Figure 31E:
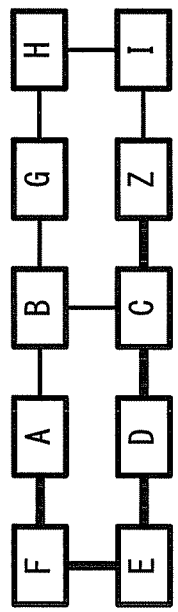

FIG. 30 is a diagram illustrating an example of the resource reservation to be performed over a network having a mesh configuration. Also over this network, it is assumed that the start node is the node A and the end node is the node Z. Over this network, if a first route 101 is set, the first route and a node-redundant route may not be set. In order to set a second route 102 and a third route 103 in a non-redundant relationship, the first route 101 must be changed. In this case, the first route and the second route have a common link CZ, and the first route and the third route have a common link AB. Therefore, the resources of the link AB and link CZ used in the first route can be used as the second route or third route. Then, in order to perform the resource reservation on the links excluding the link that are common to the first route and second route are third route, the fourth route can be calculated as described according to the first embodiment. The first route 101, second route 102 and third route 103 are added, and the link CZ that is common to the first route and the second route and the link AB that is common to the first route and the third route are subtracted therefrom. As a result, the fourth route 104 is obtained. The processing for setting the second route and the third route is as described according to the first to sixth embodiments.

The resource reservation method described according to the first to sixth embodiments can be applied even to other mesh configurations if the method can obtain the fourth route that can connect from the start node to the end node by itself.

Having described according to the first to seventh embodiments that the resource reservation, release, allocation and so on are performed from the start node side, this is for the purpose of easy understanding only. For example, the resource reservation can be performed from the end point side of a route. Therefore, the signaling using the resource reservation message can be performed by using a protocol like RSVP. In accordance with a protocol like RSVP, a Path Message is sequentially transmitted from the starting point toward the end point. If it reaches the end point, an RSVP message is sequentially transmitted from the end node in the opposite direction. At that time, the resource reservation message can be transmitted from the end point toward the starting point.

According to the first to seventh embodiments, it has been described that a reception resource and a transmission resource are simultaneously reserved with one signaling output. However, it may be configured that one of the transmission and reception resources can be processed with one signaling output.

It has further been described above the case where a part of the second route and third route, which are redundant routes, has a link that is common to the first route. However, even if one of the redundant routes agrees with the first route, the method according to the first, second, fifth or sixth embodiment may be used to perform the resource reservation. In this case, the fourth route does not include the first route.

Having described according to the first to seventh embodiments that the resource controller 22 and the message processor 23 are separate parts, they may be implemented by one part such as the resource controller 22 including the message processor 23, in accordance with the form of implementation. The details of a signaling message to be performed by the message identifying part 21 may be transmitted to the resource controller 22, the message processor 23 or both of the resource controller 22 and the message processor 23 in accordance with the implementation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A resource reservation apparatus for controlling a resource allocation on a first route established by connecting a start node with an end node over a network, and for controlling a resource reservation on a second route and a third route respectively connecting the start node with the end node to establish dual routes, the resource reservation apparatus comprising:
    a resource controller configured to create a fourth route including a link obtained by excluding a common link between the first route and the second route and by excluding a common link between the first route and the third route from links included in any of the first route, the second route and the third route, so that the first route is displaced to one of the second route and the third route, and one of the second route and the third route becomes a back-up route to the second and third routes; and
    a message generator configured to generate a message used for reserving a resource of a link included in the fourth route and to transmit the message to a node on the fourth route,
    wherein a resource reserved for a link common between the first route and the second route is used and a resource reserved for a link common between the first route and the third route is used.

2. A resource reservation apparatus for controlling allocation of a resource on a first route established by connecting a start node with an end node over a network, and for controlling a resource reservation on a second route and a third route respectively connecting the start node with the end node to establish dual routes, the resource reservation apparatus comprising:
    an apparatus control unit having a processor configured to execute a procedure, the procedure comprising:
        generating a fourth route including a link obtained by excluding a common link between the first route and the second route and by excluding a common link between the first route and the third route from links included in any one of the first route, the second route and the third route, so that the first route is displaced to one of the second route and the third route, and one of the second route and the third route becomes a back-up route to the second and third routes; and
        reserving a resource of a link included in the fourth route, wherein a resource reserved for a link common between the first route and the second route is used and a resource reserved for a link common between the first route and the third route is used.

3. The resource reservation apparatus according to claim 2, wherein a resource on the first route is allocated to the second route and to the third route so as to generate the second route and the third route.

4. The resource reservation apparatus according to claim 2, wherein said reserving reserves a resource of a link included in the second route within the link included in the fourth route as a resource used on the second route, and reserves a resource of a link included in the third route within the link included in the fourth route as a resource used on the third route.

5. The resource reservation apparatus according to claim 4, wherein said reserving detects a boundary link that is included in the fourth route and not included in both the second route and the third route on the fourth route, reserves a resource that is accommodated from a link including a start node of the fourth route to the boundary link on the fourth route for generating the third route and reserves a resource that is accommodated from the boundary link to a link including an end node of the fourth route on the fourth route for generating the second route; and
    said generating allocates to the second route a resource that is accommodated from the link including the start node of the first route to the boundary link, the resource being allocated on the first route, and allocates to the third route a resource that is accommodated from the boundary link to a link including the end node of the first route, the resource being allocated on the first route.

6. The resource reservation apparatus according to claim 2, wherein said reserving releases a resource of the link that is included in the fourth route and not included in one of the second route and the third route so as to reserve the resource on the fourth route.

7. A resource reservation method executed by a resource reservation apparatus, the recourse reservation method comprising:
    generating by the resource reservation apparatus a fourth route including a link obtained by excluding a common link between a first route and a second route and by excluding a common link between the first route and a third route from links included in any one of the first route, the second route and the third route, over a network having a resource on the first route, the second route and the third route respectively connecting a start node of the first route with an end node of the first route, so that the first route is displaced to one of the second route and the third route, and one of the second route and the third route becomes a back-up route to the second and third routes;
    reserving a resource of a link included in the fourth route, and,
    wherein a resource reserved for a link common between the first route and the second route is used and a resource reserved for a link common between the first route and the third route is used.

8. The resource reservation method according to claim 7, wherein a resource on the first route is allocated to the second route and to the third route so as to generate the second route and the third route.

9. The resource reservation method according to claim 7, wherein said reserving releases a resource of a boundary link that is included in the fourth route and not included in both the second route and the third route so as to reserve the resource on the fourth route.

10. The resource reservation method according to claim 9, wherein said reserving detects the boundary link on a basis of a first route identifier assigned at a node on the first route for identifying a link included in the first route.

11. The resource reservation method according to claim 9, wherein said reserving executes a reservation of the resource on the fourth route and a release of the resource of the boundary link on a basis of an identical signaling message.

12. The resource reservation method according to claim 7, wherein said reserving reserves a resource of a link included in the second route within the link included in the fourth route as a resource used on the second route, and reserves a resource of a link included in the third route within the link included in the fourth route as a resource used on the third route.

13. The resource reservation method according to claim 7, wherein said reserving detects a boundary link that is included in the fourth route and not included in both the second route and the third route,
reserves a resource that is accommodated from a link including a start node of the fourth route to the boundary link on the fourth route for generating the third route, and
reserves a resource that is accommodated from the boundary link to a link including an end node of the fourth route on the fourth route for generating the second route; and
said generating allocates to the second route a resource that is accommodated from the link including the start node of the first route to the boundary link on the first route, the resource being allocated on the first route, and allocates to the third route a resource that is accommodated from the boundary link to a link including the end node of the first route on the first route, the resource being allocated on the first route.

14. The resource reservation method according to claim 7, when said reserving detects a boundary link that is included in the fourth route and not included in both the second route and the third route, and detects a plurality of boundary links on the fourth route,
wherein said reserving reserves a resource that is accommodated from a link including a start node of the fourth route to a first boundary link based on the start node of the fourth route on the fourth route for generating the third route,
reserves a resource that is accommodated from the first boundary link relative to the start node of the fourth route to a second boundary link relative to the start node of the fourth route on the fourth route for generating the second route, and
reserves alternately a resource that is accommodated from after the second boundary link relative to the start node of the fourth route to one of a next boundary link and a link including an end node of the fourth route on the fourth route for one of the third route and the second route respectively; and
said generating allocates to the second route a resource that is accommodated from a link including the start node of the first route to the first boundary link relative to the start node of the first route,
allocates to the third route a resource that is accommodated from the first boundary link relative to the start node of the first route to a second boundary link based on the start node of the first node, and
allocates alternately a resource that is accommodated from the second boundary link relative to the start node of the first route to one of the next boundary link and a link including the end node of the first route, to one of the third route and the second route respectively, the resource being allocated on the first route.

15. The resource reservation method according to claim 13, further comprising:
storing one of nodes connected with the boundary link as a boundary node;
wherein said generating switches a destination of an allocation of a resource included in the first route from the second route to the third route, when said generating detects the boundary node in case of allocating a resource along the first route.

\* \* \* \* \*

UNITED STATES PATENT AND TRADEMARK OFFICE
CERTIFICATE OF CORRECTION

| | |
|---|---|
| PATENT NO. | : 8,676,947 B2 |
| APPLICATION NO. | : 12/474411 |
| DATED | : March 18, 2014 |
| INVENTOR(S) | : Tajima et al. |

Page 1 of 1

It is certified that error appears in the above-identified patent and that said Letters Patent is hereby corrected as shown below:

In the Claims

Column 26, Line 36, In Claim 7, delete "recourse" and insert -- resource --, therefor.

Signed and Sealed this
Third Day of June, 2014

Michelle K. Lee
*Deputy Director of the United States Patent and Trademark Office*